United States Patent
Li et al.

(10) Patent No.: US 8,526,475 B2
(45) Date of Patent: Sep. 3, 2013

(54) BROADENING OF RARE EARTH ION EMISSION BANDWIDTH IN PHOSPHATE BASED LASER GLASSES

(75) Inventors: Hong Li, Sewickley, PA (US); Sally Pucilowski, Duryea, PA (US); Joseph S. Hayden, Clarks Summit, PA (US)

(73) Assignee: Schott Corporation, Elmsford, NY (US)

( * ) Notice: Subject to any disclaimer, the term of this patent is extended or adjusted under 35 U.S.C. 154(b) by 5 days.

(21) Appl. No.: 12/851,947

(22) Filed: Aug. 6, 2010

(65) Prior Publication Data

US 2012/0033694 A1  Feb. 9, 2012

(51) Int. Cl.
*H01S 3/17*  (2006.01)

(52) U.S. Cl.
USPC ............... 372/40; 372/39; 501/45; 501/48

(58) Field of Classification Search
USPC ................... 372/39, 40; 501/45, 48
See application file for complete search history.

(56) References Cited

U.S. PATENT DOCUMENTS

| | | | |
|---|---|---|---|
| 5,526,369 A | 6/1996 | Hayden et al. | |
| 5,663,972 A | 9/1997 | Payne et al. | |
| 6,194,334 B1 | 2/2001 | Aitken et al. | |
| 6,656,859 B2 | 12/2003 | Aitken et al. | |
| 6,853,659 B2 * | 2/2005 | Hayden et al. | 372/39 |
| 6,859,606 B2 | 2/2005 | Jiang et al. | |
| 7,115,536 B2 * | 10/2006 | Hayden et al. | 501/45 |

FOREIGN PATENT DOCUMENTS

JP  2010184847 A  8/2010

OTHER PUBLICATIONS

Desurvire, Emmanuel. "4.5 Determination of Transition Cross Sections." (Erbium-Doped Fiber Amplifiers: Principles and Applications), Mar. 18, 1994, pp. 244-249.
Desurvire, Emmanuel. "4.3 Energy Levels of Er3 + glass: and Relaxation Processes." (Erbium-Doped Fiber Amplifiers: Principles and Applications), Mar. 18, 1994, pp. 215-219.
Hecht, Jeff. "Pumping Up the Pulse Power." (Hercules Laser Focus World), Apr. 2008, pp. 19-20.
Kassab et al. "GeO2-PbO-Bi2O3 glasses doped with Yb3+ for laser applications." (Journal of Non-Crystalline Solids), 2004, pp. 103-107, No. 348.
Hong Li et al. "Optical spectroscopy study of neodymium in sodium alumino-borosilicate glasses." (Journal of Non-Crystalline Solids), 2004, pp. 127-132, No. 349.
Miniscalco et al. "General procedure for the analysis of Er3+ cross sections." (Optics Letters), Feb. 15, 1991, pp. 258-260, vol. 16, No. 4.
Okawa, Hiroyuki. "Ytterbium-containing phosphate glasses for laser, fiber laser using the glasses, and double-cladding optical fibers using the glasses." (English Abstract of JP-2009-31445, JPO), Applicant: Asahi Glass Co. Ltd. Aug. 26, 2010.
Perry, Michael D. And Gerard Mourou. "Terawatt to Petawatt Subpicosecond Lasers." (Science), 1994-05-13, pp. 917-924, vol. 264.

(Continued)

*Primary Examiner* — Yuanda Zhang
(74) *Attorney, Agent, or Firm* — Millen, White, Zelano & Branigan, P.C.

(57) ABSTRACT

Disclosed are the use of phosphate-based glasses as a solid state laser gain medium, in particular, the invention relates to broadening the emission bandwidth of rare earth ions used as lasing ions in a phosphate-based glass composition, where the broadening of the emission bandwidth is believed to be achieved by the hybridization of the glass network.

17 Claims, 6 Drawing Sheets

Comparison of experimental emission spectrum with one derived from a spline function curve fitting routine (by using JMP version 8 software).

(56) References Cited

OTHER PUBLICATIONS

Stokowski et al. "Nd-Doped Laser Glass Spectroscopic and Physical Properties-3. Data Analysis." (Lawrence Livermore National Laboratory) 1978-11, pp. 12-18. Original Issue.

Yang et al. "Mixed Former Effect: A Kind of Composition Adjusting Method of Er-Doped Glass for Broadband . Amplification.", (Chin. Phys. Lett.) 2002, pp. 1516-1518, vol. 19, No. 10.

* cited by examiner

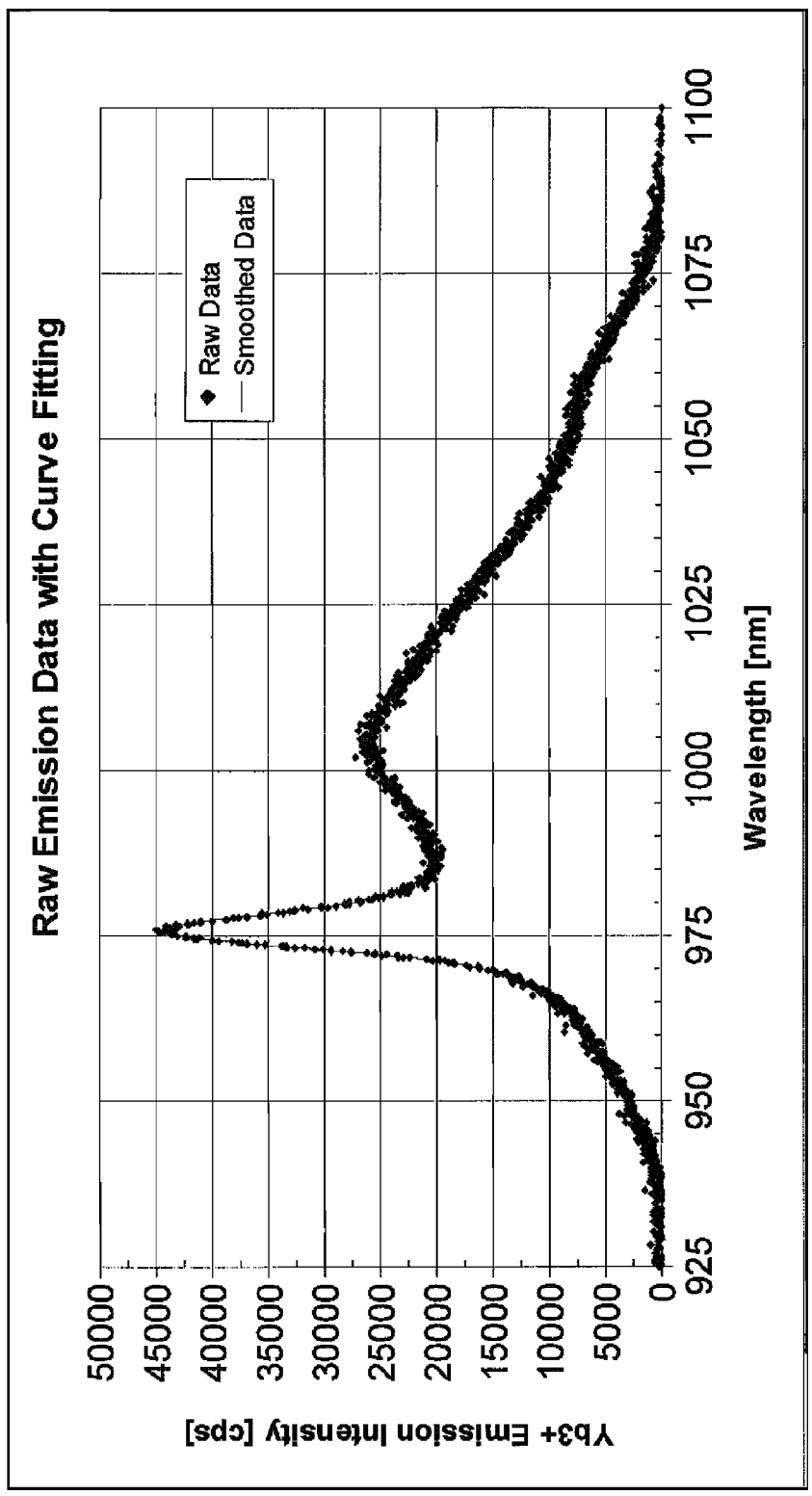
Figure 1: Comparison of experimental emission spectrum with one derived from a spline function curve fitting routine (by using JMP version 8 software).

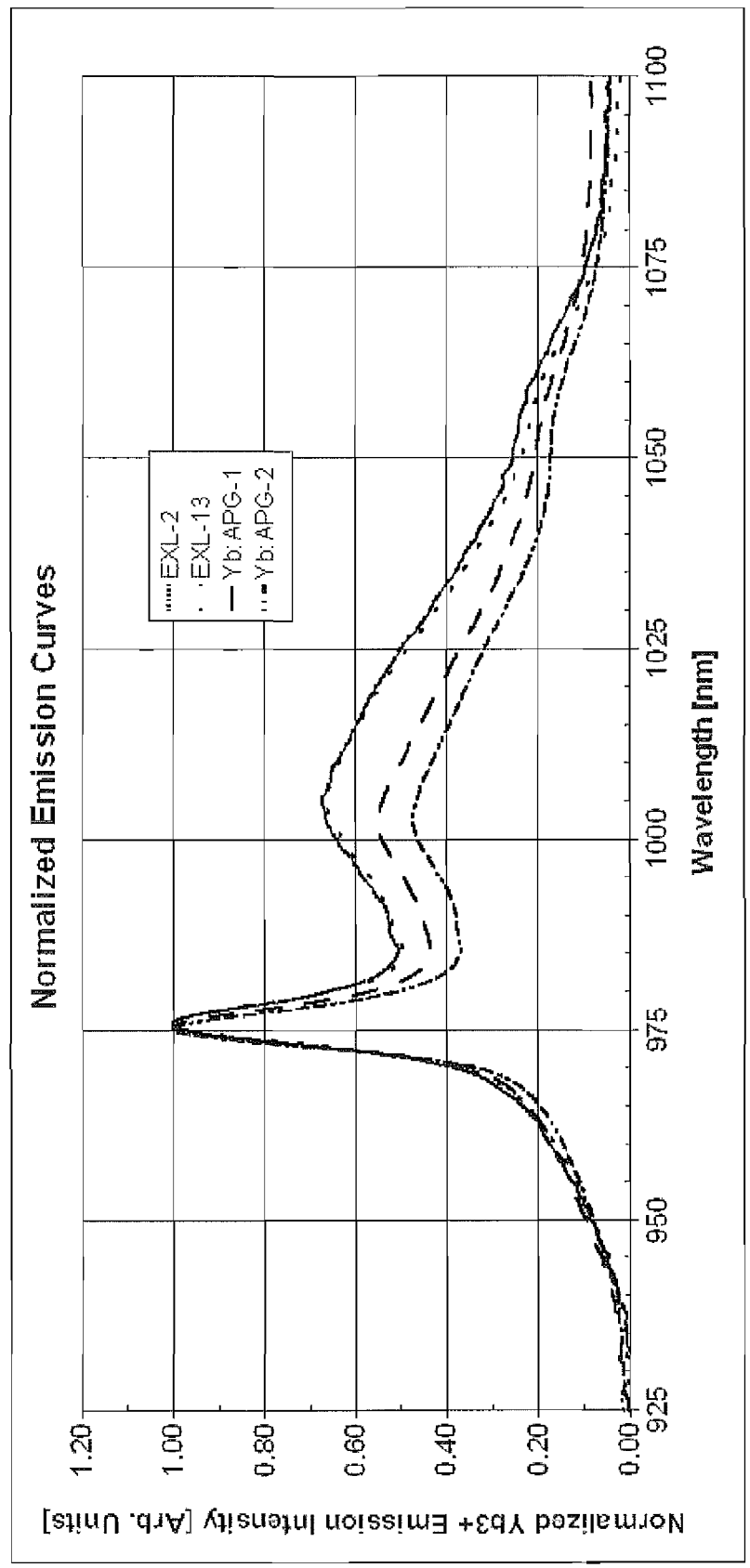
Figure 2: Yb³⁺ emission spectra of selective laser glasses (top to bottom are EXL-2, EXL-13, APG-1/Yb2, and APG-2/Yb2).

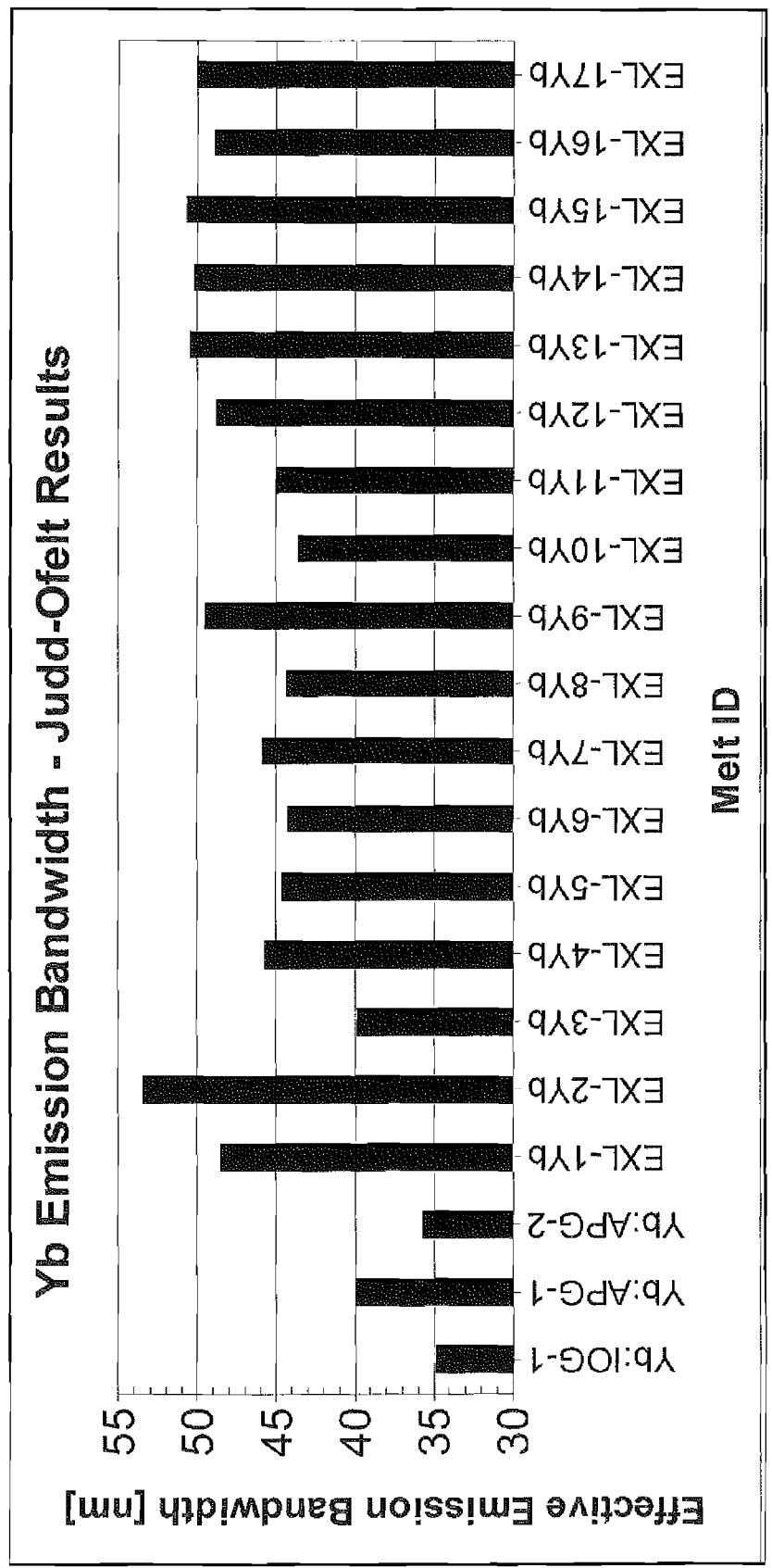
Figure 3: Effective bandwidth of $Yb^{3+}$ emission of EXL laser glass in comparison with ytterbium doped APG-1, APG-2, and IOG-1 laser glasses.

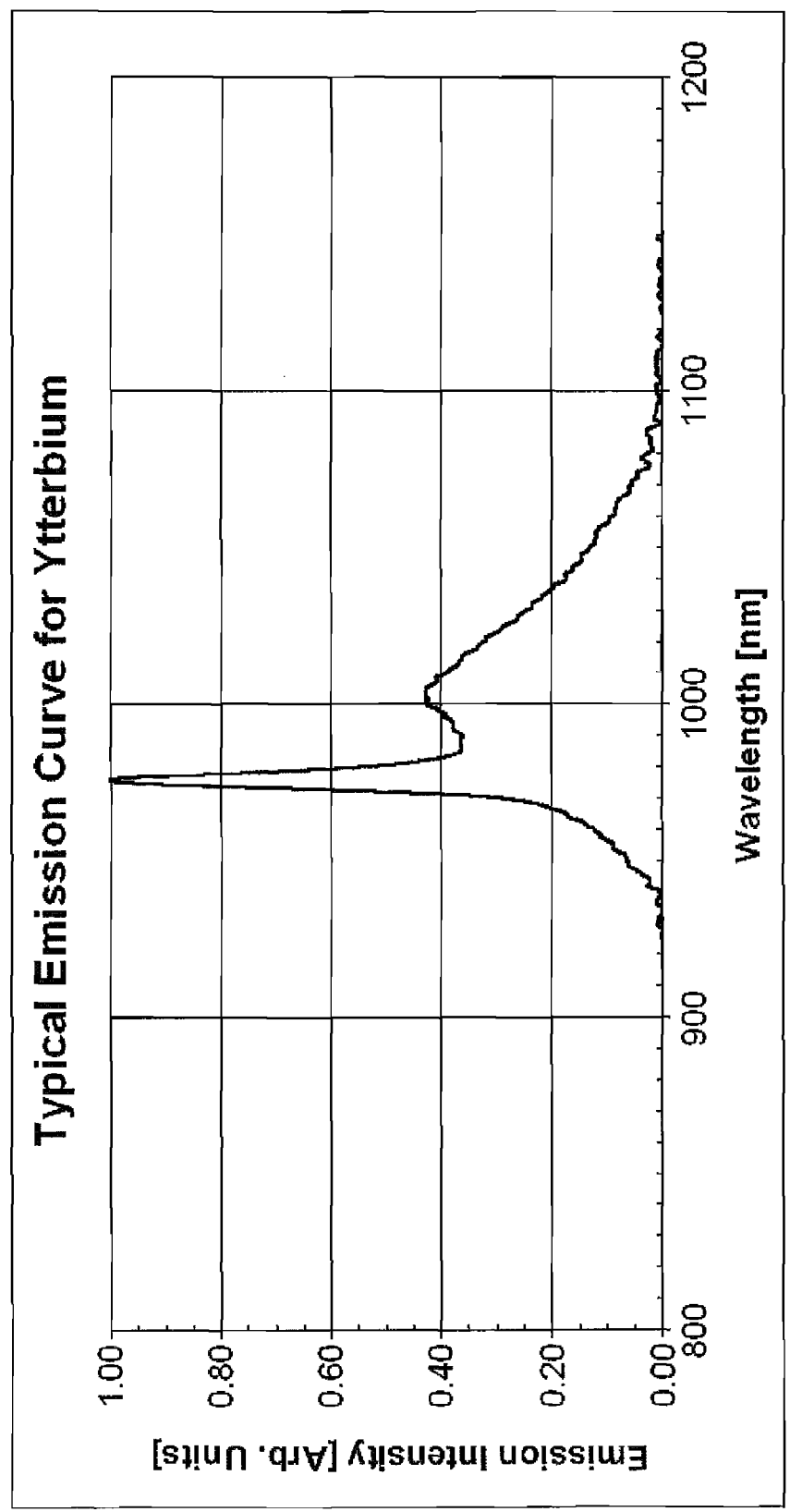
Figure 4: A typical emission spectrum for Yb.

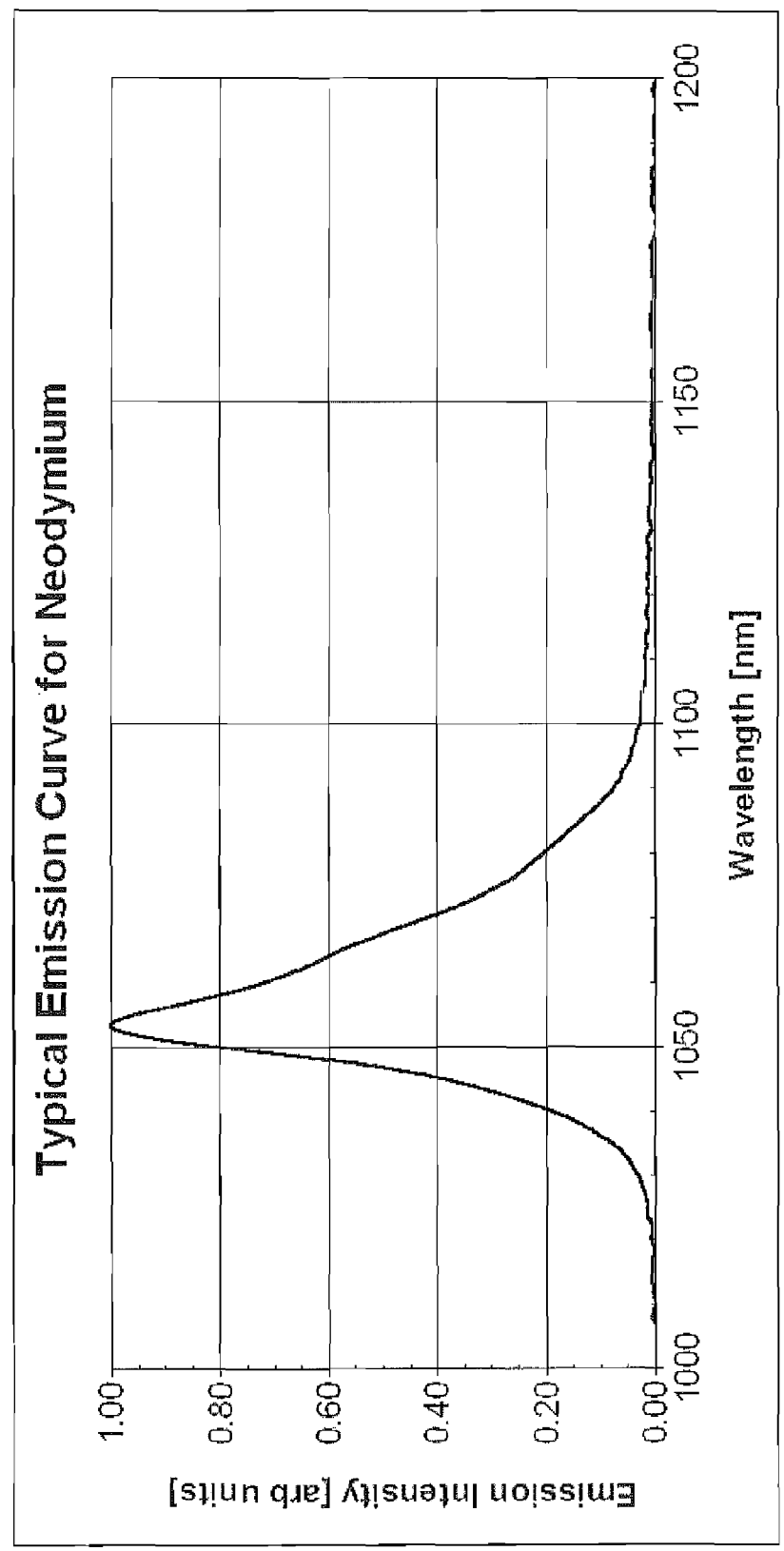
Figure 5: A typical emission spectrum for Nd.

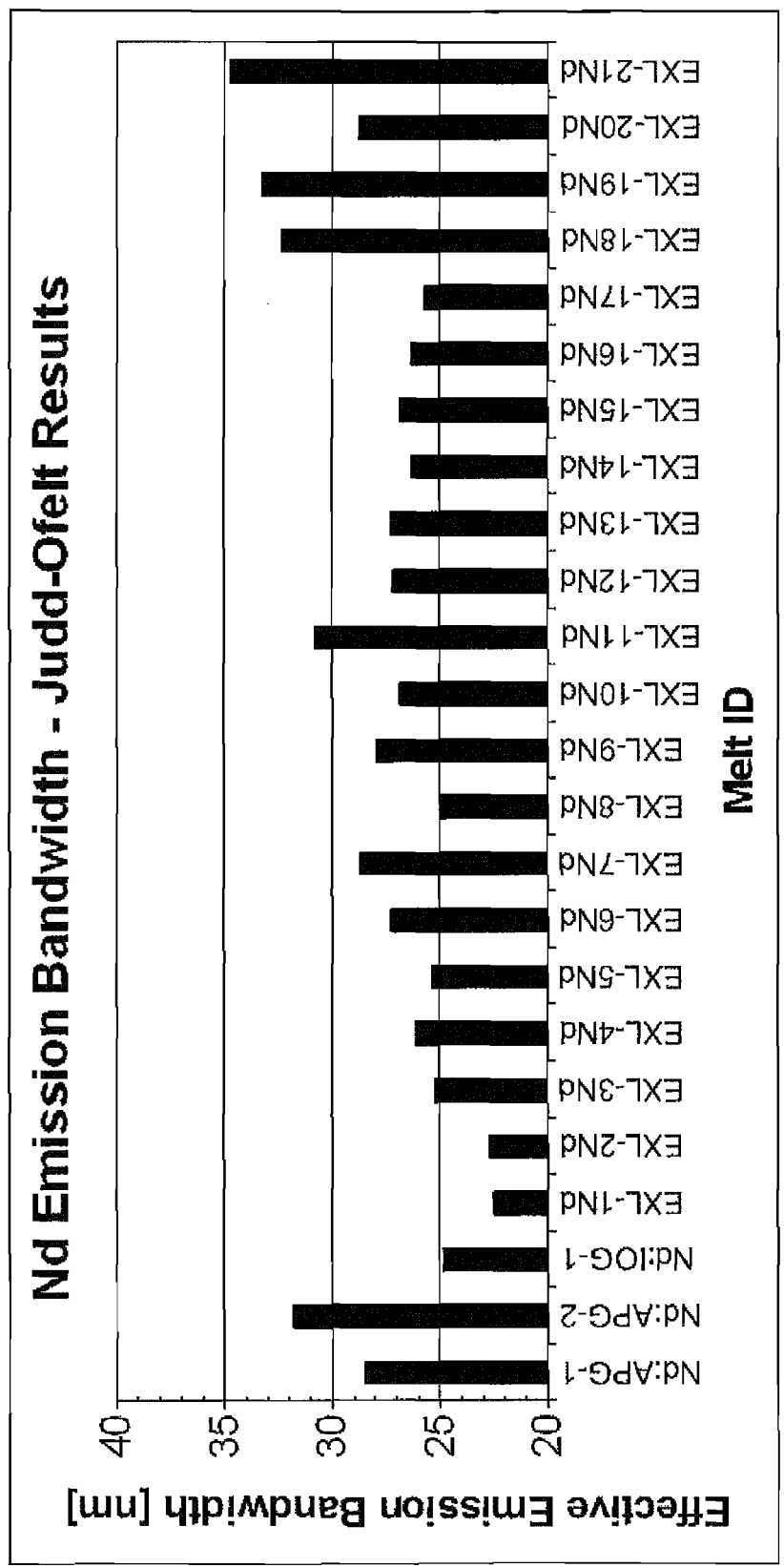
Figure 6: Effective emission bandwidth of EXL Nd laser glass in comparison with neodymium doped APG-1, APG-2 and IOG-1 laser glasses (Judd-Ofelt Results).

BROADENING OF RARE EARTH ION EMISSION BANDWIDTH IN PHOSPHATE BASED LASER GLASSES

The invention relates to the use of phosphate-based glasses as a solid state laser gain medium. In particular, the invention relates to broadening the emission bandwidth of rare earth ions used as lasing ions in a phosphate-based glass composition. The broadening of the emission bandwidth is believed to be achieved by the hybridization of the glass network.

Phosphate laser glasses are well known for use as a host matrix for high average power and high peak energy laser systems. See, for example, Payne et al. (U.S. Pat. No. 5,663,972) which discloses the use of Nd-doped phosphate laser glasses described as having broad emission bandwidths. Hayden et al. (U.S. Pat. No. 5,526,369) also discloses Nd-doped phosphate laser glasses. In this case, the laser glass is said to desirably have a narrow emission bandwidth (less than 26 nm) to improve extraction efficiency. In this typical type of laser, the emission of the laser is narrow compared to the emission bandwidth, and thus, the emitted light at wavelengths outside of the narrow bandwidth at which the laser operates is effectively wasted. For this reason, narrow emission bandwidths are desirable.

One general trend in solid state lasers is to make high energy lasers with shorter pulse lengths, which drives the power in the pulse to very high numbers. For example, a 10 k Joule laser with a 10 nsec pulse length emits a power of 1 TW (1 TW=10000 J/10 nsec). However, for high peak power lasers using ultra-short pulses (<100 femto-second pulses or shorter), the emission bandwidth offered by known phosphate laser glass is too narrow compared to that required. To address this problem so-called "mixed" laser glass laser designs are used. Phosphate and silicate glasses are used in series to achieve the total bandwidth required for current petawatt laser systems. But, the technology of using the mixed glasses is insufficient for future exawatt laser systems. New broader band phosphate glass, with or without silicate glass used in series, will be required.

The trend towards the use of high energy lasers with shorter pulse lengths is described in "Terrawatt to pettawatt subpicosecond lasers", M. D. Perry and G. Mourou, Science, Vol 264, 917-924 (1994). These lasers use a technique called Chirped Pulse Amplification (CPA) to generate ultra-short laser pulses. To work effectively, this technique requires gain media with an emission bandwidth as large as possible. In Table 1, M. D. Perry and G. Mourou describe the emission bandwidths, along with pulse length and theoretical peak, for some typical solid state laser systems.

In one aspect, the glasses disclosed herein are suitable for achieving pulselengths of less than 100 fsec and output energies above 100 kJ.

A key to short pulses is to find gain materials with broad emission bandwidth for the laser transition. The relationship between emission bandwidth and pulselength is: Bandwidth× Pulse Duration>=0.44. Clearly, to achieve ever shorter pulse durations it is desirable to identify glasses with a broad emission bandwidth.

Transition metal doped crystals offer broad emission bandwidth. For example, the Hercules laser described in Laser Focus World, April 2008, pp. 19-20, uses Ti doped sapphire crystals.

Another way to make super short pulse length lasers is with rare earth doped glasses. The advantages of such glasses over crystals include lower costs, higher available energies (since glass can be manufactured in large sizes of high optical quality, while Ti doped sapphire is limited in size), and simpler designs can be implemented since the glass approach can be pumped by flashlamps (Ti doped sapphire short pulse lasers are pumped by glass lasers which in turn are pumped by flashlamps, so the glass approach does not require one to first build pump lasers).

U.S. Pat. No. 5,663,972 appreciates the usefulness of broadband glasses. The disclosure resulted in the production of the phosphate glass APG-2, sold by Schott North America, Inc. APG-2 offers the possibility of an approach to short pulse lasers. However, APG-2 is difficult to make at high yields, and there is still a need for a material having even larger emission bandwidth.

A further useful commercial glass having a broad emission bandwidth and is the phosphate glass APG-1, also sold by Schott North America, Inc. For this reason, APG-1 glass can serve as a comparison example during development of new broadband gain materials. Additionally, the commercial glass IOG-1, a conventional phosphate glass with a narrow bandwidth emission curve, can also be utilized for comparison purposes. APG-1, APG-2, and IOG-1 doped with Nd and/or Yb are commercial laser glasses sold by Schott North America, Inc.

With respect to lasing ions, the inventors determined that Yb has a broader emission bandwidth than Nd, and as such, it may be an optimal lasing ion in an exowatt laser. It was further found, for example, that adding Yb lowered the nonlinear refractive index of the glasses of the present invention (see examples 1/Yb to 17/Yb and the corresponding examples 1/Nd to 17/Nd, where in all 17 examples with Yb compared to Nd, the nonlinear refractive index was lowered), and lowered the linear coefficient of thermal expansion of the glasses of the present invention (see examples 1/Yb to 17/Yb and the corresponding examples 1/Nd to 17/Nd, where in 15 of the 17 examples with Yb compared to Nd, the linear coefficient of thermal expansion was lowered). As such, the invention also relates to a method for lowering the nonlinear refractive index and/or lowering the thermal expansion of glasses disclosed herein which contain Nd as the rare earth dopant, by replacing at least some of the Nd with Yb, and optionally further replacing at least some of the La therein with Yb, and optionally adding further Yb. The reason La can additionally be at least in part replaced with Yb is that it is common practice to adjust the lasing ion content in a neodymium doped laser glass through the use of La, an ion that does not exhibit laser activity. More specifically, the sum of the Nd plus La is held constant, thus as the Nd content is varied for particular applications the impact on all optical and physical properties is minimized by using La as the substituted ion (all of the lanthanides behave in a similar manner within the glass structure).

The lower nonlinear index ($n_2$) means high laser energies are possible without damage to the laser glass and other optical components within the laser system from the laser beam. This is a consequence of the refractive index of glass increasing with the intensity level of the laser beam. As a result, when a laser beam passes through glass it is self-focused within the glass by an increasing amount with larger values of nonlinear index. Damage occurs when the electric field associated with the focused laser light exceeds the dielectric break-down of the glass, leading to the appearance of needle-like tracks both within the laser glass and in optical components down stream from the laser glass location within the laser system.

The lower thermal expansion means the repetition rate of the laser can be higher without breaking the glass from thermal shock. During use, the temperature of the laser glass increases because a portion of the pump energy is converting to heat within the glass. This increase in temperature is undesirable for various reasons, including the fact that there is typically a reduction in the amount of laser gain as the temperature of the gain media becomes higher (e.g. the laser glass absorbs an increasing amount of the laser intensity). The outside surfaces can be cooled by air or liquid coolant but since glass is a poor thermal conductor, the inside remains hot, setting up a thermal gradient between the center of the glass and the cooled surfaces. As a result, the glass surfaces are subjected to tensile stress, which can then cause damage to the glass, e.g., lead to breakage of the glass by thermal shock. This tensile stress is lessened as the coefficient of thermal expansion is lowered. So, a glass with lower expansion is less susceptible to damage.

However, Nd has many advantages also, for example, Nd is a four level laser, whereas Yb is a two level laser (because of the width of these energy levels Yb can act somewhat like a four level laser) that makes it more difficult to achieve laser action in a Yb doped gain media. In addition, because of its many absorption bands in the visible part of the spectrum, Nd is pumped more efficiently by flashlamps (which emit in the same spectral region) then Yb (since Yb has only a single absorption feature in the infrared portion of the spectrum). However, one way around this problem is to sensitize the Yb with transition metals such as Cr that have absorption bands in the visible portion of the spectrum and can transfer absorbed flashlamp energy to Yb in the gain media.

Laser properties for Nd are evaluated from an emission curve using Judd-Ofelt theory or by a similar technique called Fuchtbauer-Ladenburg theory. A discussion on both techniques can be found in E. Desurvire, *Erbium Doped Fiber Amplifiers*, John Wiley and Sons (1994). The properties that result include cross section for emission, $\sigma_{em}$, peak emission wavelength, $\lambda_{Peak}$, and radiative lifetime, $\tau_{Rad}$. One can apply this analysis to Yb as well, but because of the two level nature of the Yb laser system mentioned above, Yb absorbs and traps its own emission light, making a precise measurement very difficult (actually effectively impossible, Yb laser property results always have some influence from this self absorption and associated radiation trapping).

The McCumber method is another recognized technique used to get laser properties that only uses the absorption curve of the glass, as discussed in, for example, Miniscalco and Quimby, Optics Letters 16(4) pp 258-266 (1991). A weakness of the McCumber technique is that it fails to give clear results where the glass has little or no absorption to begin with, in the case of Yb this occurs at the long wavelength end of the emission curve. (It is an incidental point to note that the McCumber analysis is not applicable to Nd because Nd does not have significant absorption at any wavelength within the main emission band of interest at nominally 1 μm.)

Judd-Ofelt analysis is the preferred method and is recognized by the laser materials community but suffers (for Yb) from this self absorption/radiation trapping. However, comparing the results of Judd-Ofelt with McCumber is believed to give an indication of the reliability of the Judd-Ofelt results. This is described in L. R. P. Kassab et al., Journal of Non-Crystalline Solids 348 (2004) 103-107. After evaluation of laser properties by a complete emission curve analysis using a technique such as Judd-Ofelt, and a second analysis using the McCumber method and an absorption curve, a radiation trapping coefficient (rte) is calculated. A value close to zero is an indication that the Judd-Ofelt analysis is not strongly influenced by self absorption and radiation trapping. For this reason, there are two sets of laser properties provided in the data tables for Yb containing glasses.

Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first is to simply measure the width at half of the maximum value (called emission bandwidth full width half maximum $\Delta\lambda_{FWHM}=\lambda_{upper}-\lambda_{lower}$ where $\lambda_{upper}$ and $\lambda_{lower}$ are the wavelengths where the emission intensity falls to half of its peak value on either side of the emission curve).

A typical emission curve for Yb is provided in FIG. 4. One can readily see the one narrow feature at ~980 nm. If this feature is prominent, the $\Delta\lambda_{FWHM}$ value will only reflect the width of this one feature and the rest of the curve will not contribute. In the example tables, one will note that the Yb $\Delta\lambda_{FWHM}$ values are either about 10 nm or about 60 nm. The smaller values are exactly this case, the larger values are when this 980 nm peak is not as dominant. As a result the $\Delta\lambda_{FWHM}$ value is not always a reliable indicator of the emission bandwidth for Yb. Nd does not have this problem, as one can see in a typical Nd emission curve in FIG. 5.

The second method divides every point on the emission curve by the total area under the curve. The result, called a linewidth function, will have a peak value that is defined as the inverse of the effective bandwidth, $\Delta\lambda_{eff}$. By this method the entire emission curve always contributes to the emission bandwidth result. It is this value used herein in the analysis as the best indicator of emission bandwidth.

Introduction of multi-oxide network formers, $SiO_2$, $B_2O_3$, $TeO_2$, $Nb_2O_5$, $Bi_2O_3$, $WO_3$, and/or $GeO_2$ in the phosphate predominant network can control or broaden the distribution of lasing ion's ($Yb^{3+}$ or $Nd^{3+}$, for example) local chemical environments (in terms of the degrees of ligand field asymmetry and bond covalency). The inventors found that the network hybridization results in rare earth lasing ion emission bandwidth broadening.

The prior art glass APG-2 has a phosphate network. The inventors found that introduction of one or more oxide network forming oxides ($SiO_2$, $B_2O_3$, $TeO_2$, $Nb_2O_5$, $Bi_2O_3$, $WO_3$, and/or $GeO_2$) into the phosphate predominant network in an amount of at least 1 mol % or above, e.g., 2 mol % or above, broadened, or at least offered a broader distribution of, the local chemical environments (in terms of the degrees of ligand field asymmetry and bond covalency) for lasing ion's ($Yb^{3+}$ or $Nd^{3+}$ for example) in the glass. As a result, the P—O—P network is hybridized with Si—O—Si, B—O—B, Te—O—Te, etc., and the lasing ions can be dissolved in the molten glass and be stabilized by forming bonding with different network formers. In turn, the ligand field around the lasing ions from the different network environments varies. As a result, under the excitation of an incoming light source, the emission spectra of lasing ions is broadened as compared with pure phosphate network glasses.

In the article "Mixed Former Effects: A Kind of Compositions Adjusting Method of Er-doped glass for broadband amplification," Chin. Phys. Lett. 19[10] (2002) 1516-1518, J. H. Yang, et al. disclosed glasses based on $TeO_2$ and $Bi_2O_3$ systems with addition of $SiO_2$ or $B_2O_3$ to show band broadening comparing with silicates and phosphate based glasses that have lower bandwidth. The article offers no insight of how to broaden the emission bandwidth in $TeO_2$ and $Bi_2O_3$ based glasses by adding $SiO_2$ or $B_2O_3$, separately.

In U.S. Pat. No. 6,859,606B2 (Feb. 22, 2005), Er-doped $TeO_2$ based glasses with and without $B_2O_3$, $GeO_2$, and $WO_3$ were disclosed. Bandwidth changes were shown without explanations.

In U.S. Pat. No. 6,194,334B1 (Feb. 27, 2001), Er-doped $TeO_2$—$WO_3$ based glasses with and without $P_2O_5$ or $B_2O_3$ are disclosed. It discusses the bandwidth broadening in terms of presence of many structural motifs that yield a greater diversity of structural sites for incorporating dopant ions ($Er^{3+}$ in this case). The consequence of this is an enhanced solution of effective $Er^{3+}$ ions and broadened $Er^{3+}$ emission spectra. The glass system is not applicable to the phosphate system. Furthermore, no effects of combined $B_2O_3$ and $P_2O_5$ modification to $TeO_2$ based glasses on bandwidth broadening are considered.

In U.S. Pat. No. 6,656,859B2 (Dec. 2, 2003), Er-doped $TeO_2$—$Ta_2O_5$ based glasses with and without $Nb_2O_5$ or $B_2O_3$ are disclosed. The glass system is not applicable to the phosphate system. Furthermore, no effects of combined $B_2O_3$ and $Nb_2O_5$ modification to $TeO_2$ based glasses on bandwidth broadening are considered.

In one aspect, the laser glass compositions according to the invention relate to phosphate based glasses, e.g., a glass containing 35 mol % to about 65 mol % of $P_2O_5$, preferably about 45 mol % to about 60 mol %, which is hybridized by the addition of at least one, optionally two, three, four or more of non-phosphate oxide network formers, i.e., $SiO_2$, $B_2O_3$, $TeO_2$, $Nb_2O_5$, $Bi_2O_3$, $WO_3$, and/or $GeO_2$, and doped with one or more lasing rare earth elements 58 through 71 in the periodic table, e.g., Yb, Nd, Er, Pr, Sm, Eu, Tb, Dy, Ho and Tm, etc., preferably Yb, Nd, Er and Pr, and more preferably Yb and Nd. These rare earth elements can be used alone or in combination of one or more different ions. The sum of one or more non-phosphate network formers is at least 1 mol %, preferably, between 1.4 to 35 mol %, more preferably between 2.0 mol % to 28 mol %. The one or more lasing rare earth elements are present preferably at about 0.25 to about 5 mol %.

In a further aspect, the invention relates to a glass with composition (mol %) of

| | |
|---|---|
| $P_2O_5$ | 35-65 |
| $SiO_2$ | 0-20 |
| $B_2O_3$ | 0-15 |
| $Al_2O_3$ | >0-10 |
| $Nb_2O_5$ | 0-10 |
| $TeO_2$ | 0-5 |
| $GeO_2$ | 0-5 |
| $WO_3$ | 0-5 |
| $Bi_2O_3$ | 0-5 |
| $La_2O_3$ | 0-5 |
| $Ln_2O_3$ | >0-10 (Ln = lasing ions of elements 58 through 71 in the periodic table) |
| $R_2O$ | 10-30 (R = Li, Na, K, Rb, Cs) |
| MO | 10-30 (M = Mg, Ca, Sr, Ba, Zn) |
| $Sb_2O_3$ | 0-5 | and wherein the sum of the amounts of $SiO_2$, $B_2O_3$, $TeO_2$, $Nb_2O_5$, $Bi_2O_3$, $WO_3$, and/or $GeO_2$, is at least 1 mol %, for example, between 2 to 35 mol %, more preferably between 3 to 25 mol %, and preferably containing one or more of $SiO_2$, $B_2O_3$, $TeO_2$, and/or $Nb_2O_5$, and where such glass has an effective emission bandwidth, as evaluated by the lineshape function technique in a Judd-Ofelt analysis, for example, of greater than 32 nm for Nd, for example, greater than 33 nm for Nd, and of greater than 38 nm for Yb, for example, greater than 40 nm for Yb or greater than 41 nm for Yb.

Preferably, the $Sb_2O_3$ content is >0 to 1 mol %, more preferably 0.3 to 0.4 mol %. A preferred range for $Al_2O_3$ content is 3.5 to 6.0 mol %, preferably 3.5 to 5.0 mol %. Also preferred is a 1.0 to 4.0 mol % of $La_2O_3$ content.

In a further embodiment, the phosphate laser glass composition is doped with a rare earth element as defined above, for example, Nd and/or Yb, and comprises (based on mol %):

| | |
|---|---|
| $P_2O_5$ | 40.00-65.00 |
| $SiO_2$ | 0.00-18.00 |
| $B_2O_3$ | 0.00-12.00 |
| $Al_2O_3$ | 2.00-8.00 |
| $Li_2O$ | 0.00-20.00 |
| $K_2O$ | 0.00-20.00 |
| $Na_2O$ | 0.00-20.00 |
| MgO | 0.00-15.00 |
| CaO | 0.00-5.00 |
| BaO | 0.00-15.00 |
| $TeO_2$ | 0.00-5.00 |
| $Nd_2O_3$ and/or $Yb_2O_3$ | 0.50-3.00 |
| $La_2O_3$ | 0.00-5.00 |
| $Nb_2O_5$ | 0.00-5.00 |
| $Sb_2O_3$ | 0.00-2.00 | wherein the composition contains at least 1.00 mol % of a non-phosphate network former, e.g., at least 1.00 mol % of $TeO_2$, at least 1.00 mol % of $SiO_2$, at least 1.00 mol % of $B_2O_3$, or at least 1.00 mol % of $Nb_2O_5$. More preferably, the composition contains at least 2.00 mol % of a non-phosphate network former, e.g., at least 3.00 mol %. Nd or Yb may be substituted by other rare earth element(s) as already described herein.

In a further embodiment, the phosphate laser glass composition is doped with Yb, and comprises (based on mol %):

| | |
|---|---|
| $P_2O_5$ | 49.00-57.00 |
| $SiO_2$ | 0.00-10.00 |
| $B_2O_3$ | 0.00-5.00 |
| $Al_2O_3$ | 2.00-6.00 |
| $Li_2O$ | 1.00-18.00 |
| $K_2O$ | 1.00-18.00 |
| $Na_2O$ | 0.00-10.00 |
| MgO | 1.00-12.00 |
| CaO | 0.00-3.00 |
| BaO | 1.00-12.00 |
| $TeO_2$ | 0.00-4.00 |
| $Yb_2O_3$ | 1.00-2.50 |
| $La_2O_3$ | 0.50-3.00 |
| $Nb_2O_5$ | 0.00-4.00 |
| $Sb_2O_3$ | 0.20-0.50 | wherein the composition contains at least 1.00 mol % of a non-phosphate network former, e.g., at least 1.00 mol % of $TeO_2$, at least 1.00 mol % of $SiO_2$, at least 1.00 mol % of $B_2O_3$, or at least 1.00 mol % of $Nb_2O_5$. More preferably, the composition contains at least 2.00 mol % of a non-phosphate network former, e.g., at least 3.00 mol %. Yb may be substituted by other rare earth element(s) as already described herein.

According to another aspect, the phosphate laser glass composition according to the invention contains 1.00-18.00 mol % of $SiO_2$, for example, 1.20-15.00 mol % of $SiO_2$ or 1.25-10.00 mol % of $SiO_2$.

According to another aspect, the phosphate laser glass composition according to the invention contains 1.10-12.00 mol % of $SiO_2$ and 1.10-12.00 mol % of $B_2O_3$, for example, 1.20-11.00 mol % of $SiO_2$ and 1.20-10.00 mol % of $B_2O_3$, or 1.25-10.00 mol % of $SiO_2$ and 1.25-8.00 mol % of $B_2O_3$.

According to another aspect, the phosphate laser glass composition according to the invention contains 1.50-8.00 mol % of $Nb_2O_5$, for example, 1.60-6.50 mol % of $Nb_2O_5$, or 1.70-5.50 mol % of $Nb_2O_5$.

According to another aspect, the phosphate laser glass composition according to the invention contains 1.50-7.00 mol % of $Nb_2O_5$ and 1.10-18.00 mol % of $SiO_2$, for example, 1.60-6.00 mol % of $Nb_2O_5$ and 1.20-15.00 mol % of $SiO_2$, or 1.70-4.50 mol % of $Nb_2O_5$ and 1.25-12.00 mol % of $SiO_2$.

According to another aspect, the phosphate laser glass composition according to the invention contains 1.50-3.70 mol % of $Nb_2O_5$, 1.10-18.00 mol % of $SiO_2$ and 1.10-12.00 mol % of $B_2O_3$, for example, 1.60-3.60 mol % of $Nb_2O_5$, 1.20-15.00 mol % of $SiO_2$ and 1.20-11.00 mol % of $B_2O_3$, or 1.70-3.55 mol % of $Nb_2O_5$, 1.25-12.00 mol % of $SiO_2$ and 1.25-10.00 mol % of $B_2O_3$.

In a further aspect, the glass compositions should not contain entities that could lead to crystallization, for example, it was determined that levels of $Ta_2O_5$ above about 1 mol % can lead to crystallization of Ta—P phases, and as such, high levels of $Ta_2O_5$ should be avoided from the glasses.

According to another aspect, the phosphate laser glass composition according to the invention exhibits an effective emission bandwidth for $Yb^{3+}$ ($\Delta\lambda_{eff}$) of at least 39.50 nm, for example, 40.00-54.00 nm or 42.00-54.00 nm or 42.40-53.50 nm and an effective emission bandwidth for $Nd^{3+}$ ($\Delta\lambda_{eff}$) of at least 32.00 nm, for example 32.00-36.50 nm or 33-35 nm.

According to another aspect, the phosphate laser glass composition according to the invention exhibits an effective emission bandwidth for $Yb^{3+}$ ($\Delta\lambda_{eff}$) of at least 39.50 nm, e.g., >40.00 nm or >47.00 nm or >52.00 nm; and an effective emission bandwidth for $Nd^{3+}$ ($\Delta\lambda_{eff}$) of at least 32.00 nm, for example >34.00 nm or >36.00 nm.

In a further embodiment, any of the disclosed glasses may be further sensitized with transition metals such as Cr, e.g., $Cr_2O_3$. In some instances this makes the glasses more useable in a flashlamp pumped laser system.

With regards to the additional components, the glass contains a maximum of 4 weight percent, especially a maximum of 2 weight percent, of conventional additives or impurities, such as refining agents (e.g., $As_2O_3$ and $Sb_2O_3$) and antisolarants (e.g., $Nb_2O_5$). In addition, the glass composition may contain halides to help dry the melt of residual water and to help in the refining of the glass. For example, the glass composition may contain up to 9 wt % F, preferably not more 5 wt %, and, up to 5 wt % Cl, although Cl is less preferred than F.

The glasses according to the invention can also be prepared without a lasing ion. For example, the glasses according to the invention prepared without a lasing ion can be used as a cladding glass in a laser waveguide device. Additionally, by doping the glasses according to the invention with one or more transition metals that introduce absorption at the lasing wavelength, the resultant transition metal-doped glass can serve as an edge cladding glass in certain laser system designs.

BRIEF DESCRIPTION OF THE DRAWINGS

The invention and further details, such as features and attendant advantages, of the invention are explained in more detail below on the basis of the exemplary embodiments which are diagrammatically depicted in the drawings, and wherein:

FIG. 1 graphically illustrates the experimental $Yb^{3+}$ emission spectrum (intensity as a function of wavelength), as well as the spectrum derived from curve fitting, for the phosphate laser glass composition of EXL-7/Yb in accordance with the invention;

FIG. 2 graphically illustrates the $Yb^{3+}$ emission spectra for phosphate laser glass compositions;

FIG. 3 graphically illustrates the effective bandwidth of $Yb^{3+}$ emission of phosphate laser glass compositions in accordance with the invention and prior art phosphate laser glass compositions;

FIG. 4 illustrates a typical emission cross section curve for Yb;

FIG. 5 illustrates a typical emission cross section curve for Nd;

FIG. 6 illustrates effective bandwidth, $\Delta\lambda_{eff}$, of emission of EXL Nd laser glass in comparison with neodymium doped APG-1, APG-2, and IOG-1 laser glasses (Judd-Ofelt Results);

In FIG. 2, the $Yb^{3+}$ emission spectra of selective laser glasses are provided. For comparison purposes, the emission spectra of APG-1/Yb and APG-2/Yb are presented as representatives of typical phosphate laser glasses. The top data line to the bottom data line (for the majority of the data set) are in the following order EXL-2/Yb, EXL-13/Yb, APG-1 doped with Yb (Yb:APG-1), and APG-2 doped with Yb (Yb:APG-2).

In the examples of Table 1a and Table 4a, all of the glasses were made using laser grade ingredients and melted under dry oxygen environment with stirring action using a Pt stir for better homogeneity. Examples on Tables 3, 5a, 6a and 7a were prepared in small, <100 $cm^3$, melts that were not under a dry oxygen atmosphere or stirred; and, in many cases, were of insufficient quality to allow full property characterization. Where properties could not be measured the entry in the table is "NA". All of the glasses were cast into molds and appropriately annealed to remove stress. Yb doped glasses were then ground into fine powders using tungsten carbide grinding cell. Nd doped glasses were prepared as bulk cuvette samples at least nominally 10 mm×10 mm×40 mm in size. A powder sample of each Yb doped glass and a cuvette samples of each Nd doped glass were used to measure an emission spectrum, from which the effective emission bandwidth ($\Delta\lambda_{eff}$) was determined according to Equation (1):

$$\Delta\lambda_{eff} = \frac{\int I(\lambda)d\lambda}{I_{max}} \qquad (1)$$

where the integrated area of the emission spectrum was made between 925 and 1100 nm for Yb and from 1000 nm to 1200 nm for Nd and the maximum emission intensity ($I_{max}$) is found at the wavelength (e.g. $\lambda_{Peak}$) close to 975 nm for Yb as shown in FIG. 4 and close to 1055 nm for Nd as shown in FIG. 5. For the calculation, raw emission spectra were used that had been first curve fitted with a spline function to reduce the noise level.

Table 2 and FIG. 3 summarize the effective bandwidth results for Yb doped glasses. The relative bandwidth broadening listed in Table 2 is based on a comparison of a bandwidth of 38 nm, i.e., the average of the bandwidths for APG-1 ad APG-2. Relative to $\Delta\lambda_{eff}$ of APG-1 and APG-2, the newly designed EXL glasses showed significant improvement on band broadening, i.e., many EXL glasses have demonstrated the bandwidth wider than APG-1 and APG-2 glasses by more than 10 nm.

As can be seen in the data presented in FIG. 3, the network hybridization approach according to the invention provides clear significant improvements in Yb bandwidth. The bandwidths presented in FIG. 3 are determined by using the Judd-Ofelt analysis. All of the EXL glasses as shown in FIG. 3 have effective emission bandwidths of about 40 nm or larger.

When doping the same glasses as above with Nd, rather than Yb, some of the glasses showed improved bandwidths. But, improvement did not occur in all glasses.

Some Nd doped examples used an approach of reducing the amount of $P_2O_5$ (the dominant glass former in all the examples with Yb and Nd). While not being bound to any specific theory, it is believed that based on these data, that Nd preferentially locates in the glass structure near P, so even with network hybridization the local environments around Nd are not greatly varied. Lowering the $P_2O_5$ content in the glasses is thus an attractive path for creating Nd-doped glasses with broader emission bandwidth.

Two glasses, 21 and 17, were doped with two different rare earths (Er and Pr) in an attempt to better understand what makes emission bandwidth broader. The latter glass (17) with $TeO_2$ was heavily colored and could not be analyzed for laser properties. But for (21) at least evaluation of emission bandwidth was possible (by both Judd-Ofelt and McCumber methods) and found that Pr became broader (compared to Pr doped IOG-1, Pr:IOG-1) and that Er became more narrow (again, compared to Er doped IOG-1, Er:IOG-1).

However, improved results for Nd doped materials, but with a lower $P_2O_5$ range appears to use the network hybridization approach. Preferably, for Nd doped glasses as disclosed herein, the $P_2O$ range is 35 to 55 mol %, preferably 40 to 50 mol %, and more preferably 40-48 mol %. Optionally, the $SiO_2$ content in these glasses is higher, e.g., 8-20 mol %, preferably 10-15 mol %. Further optionally, higher amounts of $B_2O_3$ are used, for example, about 8-12 mol %, e.g., 10 mol %.

While the examples in Tables 1a, 3a and 4a use $SiO_2$, $B_2O_3$, $Nb_2O_5$, and/or $TeO_2$ as the other glass formers, other metal oxides can be used as glass formers, such as $Bi_2O_3$, $GeO_2$ and/or $WO_3$, $Ln_2O_3$ (Ln=La, Nd, Yb, Er, or Pr), $Al_2O_3$ and/or even $Sb_2O_3$. The particular compositions selected in Table 5a were only doped with Nd, and the results of emission bandwidth were not particularly broad. However, based on these data, one would fully expect that these same glasses doped with Yb would provide a broad emission bandwidth.

TABLE 1a

Glass Compositions (mol %) of New EXL Laser Glasses Containing $Yb_2O_3$

| Metal Oxide Content mol % | 1/Yb | 2/Yb | 3/Yb | 4/Yb | 5/Yb | 6/Yb | 7/Yb | 8/Yb | 9/Yb |
|---|---|---|---|---|---|---|---|---|---|
| $P_2O_5$ | 56.38 | 49.64 | 50.49 | 50.89 | 50.69 | 50.49 | 49.19 | 55.70 | 49.64 |
| $SiO_2$ | | 2.57 | | 1.29 | | 2.51 | | 2.53 | |
| $B_2O_3$ | | | 2.57 | | 1.29 | 2.57 | 2.51 | | |
| $Al_2O_3$ | 4.69 | 4.13 | 4.20 | 4.24 | 4.22 | 4.20 | 4.09 | 4.64 | 4.13 |
| $Li_2O$ | 2.780 | 2.44 | 2.49 | 2.51 | 2.50 | 2.49 | 2.42 | 2.74 | 2.44 |
| $K_2O$ | 11.93 | 10.50 | 10.68 | 10.77 | 10.73 | 10.68 | 10.41 | 11.79 | 10.50 |
| $Na_2O$ | 8.47 | 7.46 | 7.59 | 7.65 | 7.62 | 7.59 | 7.39 | 8.37 | 7.46 |
| MgO | 6.17 | 10.67 | 7.43 | 10.94 | 9.18 | 7.43 | 10.58 | 8.19 | 7.30 |
| CaO | 1.89 | 1.66 | 1.69 | 1.70 | 1.70 | 1.69 | 1.65 | 1.86 | 1.66 |
| BaO | 3.75 | 4.96 | 5.04 | 1.69 | 3.37 | 5.04 | 1.64 | 1.85 | 4.96 |
| $TeO_2$ | 1.46 | 2.53 | 2.57 | 1.73 | 2.15 | 1.71 | 1.67 | 1.89 | 1.69 |
| $Yb_2O_3$ | 1.48 | 1.51 | 1.45 | 1.54 | 1.49 | 1.52 | 1.46 | 1.47 | 1.56 |
| $La_2O_3$ | 0.62 | 0.78 | 0.87 | 2.53 | 1.70 | 0.80 | 0.80 | 1.09 | 2.41 |
| $Nb_2O_5$ | | 3.37 | | 3.46 | 1.72 | 3.43 | 3.34 | | 3.37 |
| $Sb_2O_3$ | 0.39 | 0.35 | 0.35 | 0.35 | 0.35 | 0.35 | 0.34 | 0.39 | 0.35 |
| Total | 100.01 | 100.00 | 99.99 | 100.00 | 100.00 | 99.99 | 100.00 | 99.98 | 100.00 |

| Metal Oxide Content mol % | 10/Yb | 11/Yb | 12/Yb | 13/Yb | 14/Yb | 15/Yb | 16/Yb | 17/Yb |
|---|---|---|---|---|---|---|---|---|
| $P_2O_5$ | 50.89 | 46.50 | 50.49 | 49.64 | 50.89 | 51.79 | 51.79 | 51.79 |
| $SiO_2$ | | 2.37 | 2.57 | | 2.59 | | 2.64 | 2.64 |
| $B_2O_3$ | 2.59 | 2.37 | | 2.53 | | 2.64 | | 2.64 |
| $Al_2O_3$ | 4.24 | 3.87 | 4.20 | 4.13 | 4.24 | 4.31 | 4.31 | 4.31 |
| $Li_2O$ | 2.51 | 2.29 | 2.49 | 2.44 | 2.51 | 2.55 | 2.55 | 2.55 |
| $K_2O$ | 10.77 | 9.84 | 10.68 | 10.50 | 10.77 | 10.96 | 10.96 | 10.96 |
| $Na_2O$ | 7.65 | 6.99 | 7.59 | 7.46 | 7.65 | 7.78 | 7.78 | 7.78 |
| MgO | 7.48 | 10.00 | 10.86 | 10.67 | 10.94 | 11.13 | 7.62 | 7.62 |
| CaO | 1.70 | 1.56 | 1.69 | 1.66 | 1.70 | 1.73 | 1.73 | 1.73 |
| BaO | 1.69 | 4.64 | 5.04 | 4.96 | 1.69 | 1.72 | 1.72 | 1.72 |
| $TeO_2$ | 2.59 | 2.37 | 1.71 | 1.69 | 2.59 | 2.64 | 2.64 | 1.76 |
| $Yb_2O_3$ | 1.56 | 1.51 | 1.43 | 1.47 | 1.46 | 1.42 | 1.51 | 1.47 |
| $La_2O_3$ | 2.51 | 2.23 | 0.89 | 2.50 | 2.61 | 0.96 | 0.87 | 2.67 |
| $Nb_2O_5$ | 3.46 | 3.16 | | | | | 3.52 | |
| $Sb_2O_3$ | 0.35 | 0.32 | 0.35 | 0.35 | 0.35 | 0.36 | 0.36 | 0.36 |
| Total | 99.99 | 100.02 | 99.99 | 100.00 | 99.99 | 99.99 | 100.00 | 100.00 |

TABLE 1b

Optical/Thermal/Physical Properties of New EXL Laser Glasses Containing $Yb_2O_3$ and of Reference Glasses Yb: APG-1 and Yb: IOG-1

| Optical/Thermal/Physical Property | 1/Yb | 2/Yb | 3/Yb | 4/Yb | 5/Yb | 6/Yb | 7/Yb | 8/Yb | 9/Yb | 10/Yb |
|---|---|---|---|---|---|---|---|---|---|---|
| Refractive Index at 587 nm @ 30 C./hr, $n_d$ | 1.52391 | 1.56020 | 1.53160 | 1.56187 | 1.54506 | 1.55598 | 1.55072 | 1.52463 | 1.56366 | 1.55940 |
| Abbe Number, $V_d$ | 65.24 | 54.69 | 64.99 | 54.46 | 59.74 | 55.91 | 55.89 | 65.15 | 54.88 | 55.03 |
| Density, ρ [g/cm³] | 2.759 | 2.929 | 2.828 | 2.921 | 2.867 | 2.895 | 2.830 | 2.752 | 2.967 | 2.826 |
| Indentation Fracture Toughness for 3.0N Load, $K_{IC}$ | 0.59 | 0.53 | 0.56 | 0.58 | 0.56 | 0.56 | 0.59 | 0.54 | 0.57 | 0.59 |
| Indentation Fracture Toughness for 9.8N Load, $K_{IC}$ | | | | | | | | | | |
| Thermal Conductivity @ 25 C., $K_{25\,C.}$ [W/mK] | 0.57 | 0.61 | 0.59 | 0.62 | 0.58 | 0.60 | 0.62 | 0.57 | 0.59 | 0.61 |
| Thermal Conductivity @ 90 C., $K_{90\,C.}$ [W/mK] | 0.60 | 0.63 | 0.62 | 0.65 | 0.63 | 0.64 | 0.67 | 0.61 | 0.63 | 0.66 |
| Poisson Ratio, ν | 0.26 | 0.26 | 0.26 | 0.26 | 0.26 | 0.26 | 0.26 | 0.26 | 0.26 | 0.26 |
| Young's Modulas, E [GPa] | 50.3 | 60.2 | 56.3 | 62.2 | 59.0 | 60.3 | 61.6 | 54.7 | 60.5 | 61.6 |
| Linear Coef. of Thermal Expansion, $\alpha_{20\text{-}300\,C.}$ [$10^{-7}$/K] | 142.3 | 120.4 | 135.6 | 117.3 | 124.6 | 116.6 | 116.6 | 140.3 | 116.8 | 115.7 |
| Softening Point, $T_{sp}$ [C.] | | | | | | | | | | |
| Glass Transition Temperature, $T_g$ [C.] | 388 | 428 | 410 | 446 | 431 | 439 | 450 | 406 | 441 | 457 |
| Knoop Hardness, HK | 367 | 368 | 376 | 392 | 362 | 371 | 372 | 339 | 363 | 380 |
| $\alpha_{3.333\,\mu m}$ [$cm^{-1}$] (A measure of residual OH content) | 0.57 | 0.48 | 0.62 | 0.39 | 0.43 | 0.54 | 0.50 | 0.55 | 0.55 | 0.51 |
| $\alpha_{3.0\,\mu m}$ [$cm^{-1}$] (A measure of residual OH content) | 0.26 | 0.29 | 0.31 | 0.26 | 0.26 | 0.30 | 0.28 | 0.27 | 0.34 | 0.29 |

| Optical/Thermal/Physical Property | 11/Yb | 12/Yb | 13/Yb | 14/Yb | 15/Yb | 16/Yb | 17/Yb | Yb: APG-1 | Yb: IOG-1 |
|---|---|---|---|---|---|---|---|---|---|
| Refractive Index at 587 nm @ 30 C./hr, $n_d$ | 1.56470 | 1.52920 | 1.53961 | 1.53329 | 1.52566 | 1.55109 | 1.53195 | 1.52935 | 1.52060 |
| Abbe Number, $V_d$ | 54.83 | 65.87 | 64.86 | 64.58 | 65.48 | 64.30 | 64.92 | 68.39 | 67.61 |
| Density, ρ [g/cm³] | 2.826 | 2.824 | 2.834 | 2.836 | 2.760 | 2.818 | 2.816 | 2.622 | 2.733 |
| Indentation Fracture Toughness for 3.0N Load, $K_{IC}$ | 0.62 | 0.58 | 0.56 | 0.57 | 0.56 | 0.61 | 0.60 | 0.84 | |
| Indentation Fracture Toughness for 9.8N Load, $K_{IC}$ | | | | | | | | | |
| Thermal Conductivity @ 25 C., $K_{25\,C.}$ [W/mK] | 0.60 | 0.59 | 0.57 | 0.58 | 0.60 | 0.59 | 0.59 | 0.81 | |
| Thermal Conductivity @ 90 C., $K_{90\,C.}$ [W/mK] | 0.65 | 0.63 | 0.62 | 0.63 | 0.65 | 0.64 | 0.64 | 0.86 | |
| Poisson Ratio, ν | 0.26 | 0.26 | 0.26 | 0.26 | 0.26 | 0.26 | 0.26 | 0.24 | |
| Young's Modulas, E [GPa] | 63.3 | 57.6 | 59.5 | 58.6 | 58.0 | 58.4 | 57.6 | 67.1 | |
| Linear Coef. of Thermal Expansion, $\alpha_{20\text{-}300\,C.}$ [$10^{-7}$/K] | 112.6 | 132.6 | 132.6 | 126.6 | 126.4 | 120.9 | 128.7 | 97.4 | |
| Softening Point, $T_{sp}$ [C.] | | | | | | | | 569.8 | |
| Glass Transition Temperature, $T_g$ [C.] | 455 | 415 | 429 | 426 | 420 | 424 | 422 | 475 | |
| Knoop Hardness, HK | 381 | 349 | 358 | 356 | 353 | 384 | 367 | 464 | |
| $\alpha_{3.333\,\mu m}$ [$cm^{-1}$] (A measure of residual OH content) | 0.46 | 0.51 | 0.57 | 0.34 | 0.59 | 0.69 | 0.49 | 1.60 | 1.31 |
| $\alpha_{3.0\,\mu m}$ [$cm^{-1}$] (A measure of residual OH content) | 0.30 | 0.29 | 0.33 | 0.22 | 0.31 | 0.36 | 0.27 | 0.97 | 0.70 |

TABLE 1c

Laser Properties of New EXL Laser Glasses Containing $Yb_2O_3$ and of Reference Glasses Yb: APG-1 and Yb: IOG-1

| Laser Property | 1/Yb | 2/Yb | 3/Yb | 4/Yb | 5/Yb | 6/Yb | 7/Yb | 8/Yb | 9/Yb | 10/Yb |
|---|---|---|---|---|---|---|---|---|---|---|
| Refractive Index at 1000 nm, $n_{1000\,nm}$ | 1.516 | 1.550 | 1.524 | 1.552 | 1.536 | 1.546 | 1.541 | 1.517 | 1.554 | 1.549 |
| Non-linear Refractive Index, $n_2$ [$10^{-13}$ esu] | 1.15 | 1.66 | 1.18 | 1.68 | 1.39 | 1.59 | 1.56 | 1.15 | 1.67 | 1.64 |

TABLE 1c-continued

Laser Properties of New EXL Laser Glasses Containing $Yb_2O_3$ and of Reference Glasses Yb: APG-1 and Yb: IOG-1

| | | | | | | | | | | |
|---|---|---|---|---|---|---|---|---|---|---|
| Fluorescence Lifetime, τ [msec] | 2459 | 2161 | 2277 | 2356 | 2339 | 2361 | 2401 | 2376 | 2337 | 2213 |
| Input $Yb_2O_3$ [wt %] | 4.75 | 4.75 | 4.76 | 4.76 | 4.74 | 4.74 | 4.76 | 4.76 | 4.74 | 4.76 |
| $\lambda_{Peak}^P$ [nm] (Judd-Ofelt) | 976.1 | 975.9 | 975.9 | 976.0 | 975.7 | 975.9 | 975.9 | 975.9 | 975.9 | 975.9 |
| $\Delta\lambda_{eff}$ [nm] (Judd-Ofelt) | 48.53 | 53.47 | 39.84 | 45.78 | 44.71 | 44.35 | 45.87 | 44.40 | 49.56 | 43.63 |
| Maximum $\sigma_{em}^P$ [$10^{-20}$ cm²] (Judd-Ofelt) | 1.09 | 0.94 | 1.26 | 1.00 | 0.99 | 0.98 | 1.06 | 1.08 | 0.91 | 1.06 |
| Maximum $\sigma_{em}^s$ [$10^{-20}$ cm²] (Judd-Ofelt) | 0.78 | 0.73 | 0.73 | 0.63 | 0.65 | 0.62 | 0.71 | 0.70 | 0.66 | 0.68 |
| $\lambda_{Peak}^s$ [nm] (Judd-Ofelt) | 1004.1 | 1007.8 | 1004.0 | 1004.9 | 1006.4 | 1005.9 | 1005.4 | 1004.3 | 1006.0 | 1003.3 |
| $\Delta\lambda_{FWHM}$ [nm] (Judd-Ofelt) | 55.00 | 62.30 | 10.10 | 11.30 | 12.50 | 12.30 | 11.50 | 50.60 | 58.60 | 10.40 |
| $\tau_R$ [msec] (Judd-Ofelt) | 0.99 | 1.00 | 1.03 | 1.10 | 1.15 | 1.15 | 1.04 | 1.09 | 1.11 | 1.09 |
| $\lambda_{Peak}^P$ [nm] (McCumber) | 975.6 | 975.0 | 975.3 | 975.2 | 975.0 | 974.9 | 974.7 | 975.2 | 974.7 | 974.9 |
| $\Delta\lambda_{eff}$ [nm] (McCumber) | 16.36 | 16.85 | 17.23 | 18.76 | 19.96 | 20.15 | 19.82 | 19.90 | 19.60 | 19.59 |
| Maximum $\sigma_{em}^P$ [$10^{-20}$ cm²] (McCumber) | 2.41 | 2.23 | 2.18 | 1.82 | 1.66 | 1.62 | 1.83 | 1.80 | 1.71 | 1.76 |
| Maximum $\sigma_{em}^s$ [$10^{-20}$ cm²] (McCumber) | 0.60 | 0.59 | 0.58 | 0.55 | 0.55 | 0.54 | 0.61 | 0.58 | 0.55 | 0.56 |
| $\lambda_{Peak}^s$ [nm] (McCumber) | 1000.4 | 1003.5 | 1001.9 | 1002.4 | 1001.6 | 1003.9 | 1002.2 | 1001.5 | 1003.0 | 1003.6 |
| $\Delta\lambda_{FWHM}$ [nm] (McCumber) | 5.10 | 5.10 | 5.40 | 6.10 | 6.60 | 6.60 | 6.50 | 6.50 | 6.40 | 6.40 |
| $\tau_R$ [msec] (McCumber) | 1.13 | 0.93 | 1.07 | 1.39 | 1.15 | 1.14 | 1.05 | 1.13 | 1.13 | 1.12 |
| Radiation Trapping Coefficient, rtc | 1.89 | 1.95 | 1.15 | 1.10 | 0.97 | 0.86 | 1.02 | 1.01 | 1.26 | 1.00 |

| | Example No. | | | | | | | | |
|---|---|---|---|---|---|---|---|---|---|
| Laser Property | 11/Yb | 12/Yb | 13/Yb | 14/Yb | 15/Yb | 16/Yb | 17/Yb | Yb: APG-1 | Yb: IOG-1 |
| Refractive Index at 1000 nm, $n_{1000\,nm}$ | 1.555 | 1.521 | 1.531 | 1.525 | 1.518 | 1.543 | 1.524 | 1.522 | 1.513 |
| Non-linear Refractive Index, $n_2$ [$10^{-13}$ esu] | 1.68 | 1.15 | 1.21 | 1.20 | 1.15 | 1.61 | 1.18 | 1.09 | 1.07 |
| Fluorescence Lifetime, τ [msec] | 2169 | 2392 | 2915 | 2217 | 2731 | 2795 | 2863 | 2150 | 2542 |
| Input $Yb_2O_3$ [wt %] | 4.74 | 4.76 | 4.74 | 4.75 | 4.75 | 4.74 | 4.74 | 4.75 | 4.73 |
| $\lambda_{Peak}^P$ [nm] (Judd-Ofelt) | 975.9 | 975.9 | 976.0 | 975.9 | 976.0 | 976.1 | 975.9 | 975.5 | 976.1 |
| $\Delta\lambda_{eff}$ [nm] (Judd-Ofelt) | 45.09 | 48.84 | 50.48 | 50.25 | 50.67 | 48.97 | 50.12 | 40.09 | 34.86 |
| Maximum $\sigma_{em}^P$ [$10^{-20}$ cm²] (Judd-Ofelt) | 1.05 | 0.94 | 0.91 | 0.92 | 0.92 | 0.95 | 0.90 | 1.10 | 1.31 |
| Maximum $\sigma_{em}^s$ [$10^{-20}$ cm²] (Judd-Ofelt) | 0.68 | 0.67 | 0.68 | 0.67 | 0.70 | 0.68 | 0.67 | 0.64 | 0.63 |
| $\lambda_{Peak}^s$ [nm] (Judd-Ofelt) | 1006.9 | 1004.6 | 1006.9 | 1006.8 | 1003.7 | 1005.4 | 1004.3 | 1002.7 | 1005.1 |
| $\Delta\lambda_{FWHM}$ [nm] (Judd-Ofelt) | 10.70 | 57.00 | 59.80 | 58.60 | 59.60 | 56.60 | 59.20 | 9.70 | 8.60 |
| $\tau_R$ [msec] (Judd-Ofelt) | 1.06 | 1.13 | 1.12 | 1.12 | 1.12 | 1.09 | 1.15 | 1.18 | 1.15 |
| $\lambda_{Peak}^P$ [nm] (McCumber) | 974.7 | 975.0 | 975.0 | 974.7 | 974.9 | 974.9 | 974.8 | 974.9 | 975.5 |
| $\Delta\lambda_{eff}$ [nm] (McCumber) | 19.67 | 19.55 | 19.45 | 19.46 | 19.30 | 19.49 | 19.39 | 18.71 | 18.28 |
| Maximum $\sigma_{em}^P$ [$10^{-20}$ cm²] (McCumber) | 1.79 | 1.75 | 1.76 | 1.76 | 1.81 | 1.77 | 1.73 | 1.76 | 1.87 |
| Maximum $\sigma_{em}^s$ [$10^{-20}$ cm²] (McCumber) | 0.58 | 0.55 | 0.56 | 0.56 | 0.57 | 0.57 | 0.55 | 0.56 | 0.56 |
| $\lambda_{Peak}^s$ [nm] (McCumber) | 1003.9 | 1003.3 | 1002.5 | 1002.5 | 1001.1 | 1002.6 | 1002.1 | 1002.2 | 1003.2 |
| $\Delta\lambda_{FWHM}$ [nm] (McCumber) | 6.40 | 6.40 | 6.40 | 6.30 | 6.30 | 6.30 | 6.30 | 6.10 | 6.00 |
| $\tau_R$ [msec] (McCumber) | 1.03 | 1.14 | 1.15 | 1.18 | 1.14 | 1.13 | 1.19 | 1.18 | 1.24 |
| Radiation Trapping Coefficient, rtc | 1.00 | 1.25 | 1.34 | 1.33 | 1.40 | 1.24 | 1.32 | 0.85 | 0.61 |

TABLE 2

Effective Emission Bandwidth of $Yb^{3+}$ Ions in New EXL Phosphate Laser Glasses Comparing with Existing Phosphate Laser Glasses

| | Lasing ion | | | |
|---|---|---|---|---|
| | $Yb^{3+}$ | | | |
| | $Yb_2O_3$ | | | Relative Band Broadening |
| Example | wt % | mol % | $\Delta\lambda_{eff}$ (nm) | (nm) |
| 1 | 4.75 | 1.48 | 48.53 | 10.64 |
| 2 | 4.75 | 1.51 | 53.47 | 15.59 |
| 3 | 4.76 | 1.45 | 39.84 | 1.96 |
| 4 | 4.76 | 1.54 | 45.78 | 7.89 |
| 5 | 4.74 | 1.49 | 44.71 | 6.83 |
| 6 | 4.74 | 1.52 | 44.35 | 6.46 |
| 7 | 4.76 | 1.46 | 45.87 | 7.99 |
| 8 | 4.76 | 1.47 | 44.40 | 6.52 |

TABLE 2-continued

Effective Emission Bandwidth of $Yb^{3+}$ Ions in New EXL Phosphate Laser Glasses Comparing with Existing Phosphate Laser Glasses

| | Lasing ion | | | |
|---|---|---|---|---|
| | | $Yb^{3+}$ | | |
| | $Yb_2O_3$ | | | Relative Band Broadening |
| Example | wt % | mol % | $\Delta\lambda_{eff}$ (nm) | (nm) |
| 9 | 4.74 | 1.56 | 49.56 | 11.67 |
| 10 | 4.76 | 1.56 | 43.63 | 5.74 |
| 11 | 4.74 | 1.51 | 45.09 | 7.21 |
| 12 | 4.76 | 1.43 | 48.84 | 10.96 |
| 13 | 4.74 | 1.47 | 50.48 | 12.60 |
| 14 | 4.75 | 1.46 | 50.25 | 12.37 |
| 15 | 4.75 | 1.42 | 50.67 | 12.78 |
| 16 | 4.74 | 1.51 | 48.97 | 11.08 |
| 17 | 4.74 | 1.47 | 50.12 | 12.23 |
| Yb:APG-1 | 4.75 | 1.38 | 40.09 | Ref |
| Yb:APG-2 | 4.72 | 1.40 | 35.67 | Ref |
| Yb:IOG-1 | 4.73 | 1.50 | 34.86 | −3.02 |

TABLE 3a $Cr_2O_3$ Sensitized EXL-17 with $Yb_2O_3$ (mol %)

| Metal Oxide Content | Example No. | |
|---|---|---|
| mol % | 17S/1 | 17S/2 |
| $SiO_2$ | 2.638 | 2.639 |
| $B_2O_3$ | 2.638 | 2.639 |
| $P_2O_5$ | 51.753 | 51.771 |
| $Al_2O_3$ | 4.307 | 4.308 |
| $Li_2O$ | 2.548 | 2.549 |
| $Na_2O$ | 7.774 | 7.777 |
| $K_2O$ | 10.952 | 10.956 |
| MgO | 7.615 | 7.617 |
| CaO | 1.729 | 1.729 |
| BaO | 1.719 | 1.719 |
| $TeO_2$ | 1.759 | 1.759 |
| $La_2O_3$ | 2.668 | 2.669 |
| $Yb_2O_3$ | 1.469 | 1.469 |
| $Cr_2O_3$ | 0.072 | 0.036 |
| $Sb_2O_3$ | 0.360 | 0.360 |

TABLE 3b

Optical/Thermal/Physical Properties of $Cr_2O_3$ Sensitized EXL-17 with $Yb_2O_3$

| Optical/Thermal/Physical Property | Example No. | | |
|---|---|---|---|
| | 17S/1 | 17S/2 | 17/Yb |
| Refractive Index at 587 nm @ 30 C./hr, $n_d$ | 1.53277 | 1.53283 | 1.53195 |
| Abbe Number, $V_d$ | 65.19 | 64.96 | 64.92 |
| OH @ 3000 nm | 0.344 | 0.291 | 0.267 |
| OH @ 3333 nm | 0.644 | 0.535 | 0.487 |
| Density, $\rho$ [g/cm³] | 2.819 | 2.820 | 2.816 |
| Linear Coef. of Thermal Expansion, $\alpha_{20-300\ C.}$ [$10^{-7}$/K] | 124.1 | 124.1 | 128.7 |
| Tg [C.] | 429 | 430 | 422 |

TABLE 3c

Laser Properties of $Cr_2O_3$ Sensitized EXL-17 with $Yb_2O_3$

| Laser Property | Example No. | | |
|---|---|---|---|
| | 17S/1 | 17S/2 | 17/Yb |
| Refractive Index at 1000 nm, $n_{1000\ nm}$ | 1.525 | 1.525 | 1.524 |
| Non-linear Refractive Index, $n_2$ [$10^{-13}$ esu] | 1.18 | 1.18 | 1.18 |
| Fluorescence Lifetime, $\tau$ [msec] | 2522 | 2718 | 2863 |
| Input $Yb_2O_3$ [wt %] | 4.73 | 4.74 | 4.74 |
| $\lambda_{Peak}^p$ [nm] (Judd-Ofelt) | 975.3 | 975.3 | 975.9 |
| $\Delta\lambda_{eff}$ [nm] (Judd-Ofelt) | 32.24 | 38.18 | 50.12 |
| Maximum $\sigma_{em}^p$ [$10^{-20}$ cm²] (Judd-Ofelt) | 1.28 | 1.12 | 0.90 |
| Maximum $\sigma_{em}^s$ [$10^{-20}$ cm²] (Judd-Ofelt) | 0.54 | 0.57 | 0.67 |
| $\lambda_{Peak}^s$ [nm] (Judd-Ofelt) | 1003.5 | 1003.3 | 1004.3 |
| $\Delta\lambda_{FWHM}$ [nm] (Judd-Ofelt) | 8.0 | 9.2 | 59.20 |
| $\tau_R$ [msec] (Judd-Ofelt) | 1.25 | 1.21 | 1.15 |
| $\lambda_{Peak}^p$ [nm] (McCumber) | 974.7 | 974.8 | 974.8 |
| $\Delta\lambda_{eff}$ [nm] (McCumber) | 18.13 | 18.81 | 19.39 |
| Maximum $\sigma_{em}^p$ [$10^{-20}$ cm²] (McCumber) | 1.70 | 1.69 | 1.73 |
| Maximum $\sigma_{em}^s$ [$10^{-20}$ cm²] (McCumber) | 0.51 | 0.53 | 0.55 |
| $\lambda_{Peak}^s$ [nm] (McCumber) | 1002.2 | 1003.1 | 1002.1 |
| $\Delta\lambda_{FWHM}$ [nm] (McCumber) | 6.30 | 6.4 | 6.30 |
| $\tau_R$ [msec] (McCumber) | 1.67 | 1.38 | 1.19 |
| Radiation Trapping Coefficient, rtc | 0.43 | 0.65 | 1.32 |

TABLE 4a

Glass Compositions (mol %) of New EXL Laser Glasses Containing $Nd_2O_3$

| Metal Oxide Content | Example No. | | | | | | | | |
|---|---|---|---|---|---|---|---|---|---|
| mol % | 1/Nd | 2/Nd | 3/Nd | 4/Nd | 5/Nd | 6/Nd | 7/Nd | 8/Nd | 9/Nd |
| $P_2O_5$ | 56.38 | 49.64 | 50.49 | 50.89 | 50.69 | 50.49 | 49.19 | 55.70 | 49.64 |
| $SiO_2$ | 0.00 | 0.00 | 2.57 | 0.00 | 1.29 | 0.00 | 2.51 | 0.00 | 2.53 |
| $B_2O_3$ | 0.00 | 0.00 | 2.57 | 0.00 | 1.29 | 2.57 | 2.51 | 0.00 | 0.00 |
| $Al_2O_3$ | 4.69 | 4.13 | 4.20 | 4.24 | 4.22 | 4.20 | 4.09 | 4.64 | 4.13 |
| $Li_2O$ | 2.78 | 2.44 | 2.49 | 2.51 | 2.50 | 2.49 | 2.42 | 2.74 | 2.44 |
| $K_2O$ | 11.93 | 10.50 | 10.68 | 10.77 | 10.73 | 10.68 | 10.41 | 11.79 | 10.50 |
| $Na_2O$ | 8.47 | 7.46 | 7.59 | 7.65 | 7.62 | 7.59 | 7.39 | 8.37 | 7.46 |
| MgO | 6.17 | 10.67 | 7.43 | 10.94 | 9.18 | 7.43 | 10.58 | 8.19 | 7.30 |
| CaO | 1.89 | 1.66 | 1.69 | 1.70 | 1.70 | 1.69 | 1.65 | 1.86 | 1.66 |
| BaO | 3.75 | 4.96 | 5.04 | 1.69 | 3.37 | 5.04 | 1.64 | 1.85 | 4.96 |
| $TeO_2$ | 1.44 | 2.53 | 2.57 | 1.73 | 2.15 | 1.71 | 1.67 | 1.89 | 1.69 |
| $Ta_2O_5$ | 0.00 | 0.00 | 0.00 | 0.00 | 0.00 | 0.00 | 0.00 | 0.00 | 0.00 |
| $Nd_2O_3$ | 0.68 | 0.60 | 0.61 | 0.61 | 0.61 | 0.61 | 0.59 | 0.67 | 0.60 |
| $La_2O_3$ | 1.44 | 1.69 | 1.71 | 3.46 | 2.58 | 1.71 | 1.67 | 1.89 | 3.37 |

TABLE 4a-continued

Glass Compositions (mol %) of New EXL Laser Glasses Containing Nd$_2$O$_3$

| | | | | | | | | | |
|---|---|---|---|---|---|---|---|---|---|
| Nb$_2$O$_5$ | 0.00 | 3.37 | 0.00 | 3.46 | 1.72 | 3.43 | 3.34 | 0.00 | 3.37 |
| Sb$_2$O$_3$ | 0.39 | 0.35 | 0.35 | 0.35 | 0.35 | 0.35 | 0.34 | 0.39 | 0.35 |
| Total | 100.00 | 100.00 | 100.00 | 100.00 | 100.00 | 100.00 | 100.00 | 100.00 | 100.00 |

| Metal Oxide Content | Example No. | | | | | | | |
|---|---|---|---|---|---|---|---|---|
| mol % | 10/Nd | 11/Nd | 12/Nd | 13/Nd | 14/Nd | 15/Nd | 16/Nd | 17/Nd |
| P$_2$O$_5$ | 50.89 | 46.50 | 50.49 | 49.64 | 50.89 | 51.79 | 51.79 | 51.79 |
| SiO$_2$ | 0.00 | 2.37 | 2.57 | 0.00 | 2.59 | 0.00 | 2.64 | 2.64 |
| B$_2$O$_3$ | 2.59 | 2.37 | 0.00 | 2.53 | 0.00 | 2.64 | 0.00 | 2.64 |
| Al$_2$O$_3$ | 4.24 | 3.87 | 4.20 | 4.13 | 4.24 | 4.31 | 4.31 | 4.31 |
| Li$_2$O | 2.51 | 2.29 | 2.49 | 2.44 | 2.51 | 2.55 | 2.55 | 2.55 |
| K$_2$O | 10.77 | 9.84 | 10.68 | 10.50 | 10.77 | 10.96 | 10.96 | 10.96 |
| Na$_2$O | 7.65 | 6.99 | 7.59 | 7.46 | 7.65 | 7.78 | 7.78 | 7.78 |
| MgO | 7.48 | 10.00 | 10.86 | 10.67 | 10.94 | 11.13 | 7.62 | 7.62 |
| CaO | 1.70 | 1.56 | 1.69 | 1.66 | 1.70 | 1.73 | 1.73 | 1.73 |
| BaO | 1.69 | 4.64 | 5.04 | 4.96 | 1.69 | 1.72 | 1.72 | 1.72 |
| TeO$_2$ | 2.59 | 2.37 | 1.71 | 1.69 | 2.59 | 2.64 | 2.64 | 1.76 |
| Ta$_2$O$_5$ | 0.00 | 0.00 | 0.00 | 0.00 | 0.00 | 0.00 | 0.00 | 0.00 |
| Nd$_2$O$_3$ | 0.61 | 0.56 | 0.61 | 0.60 | 0.61 | 0.62 | 0.62 | 0.62 |
| La$_2$O$_3$ | 3.46 | 3.16 | 1.71 | 3.37 | 3.46 | 1.76 | 1.76 | 3.52 |
| Nb$_2$O$_5$ | 3.46 | 3.16 | 0.00 | 0.00 | 0.00 | 0.00 | 3.52 | 0.00 |
| Sb$_2$O$_3$ | 0.35 | 0.32 | 0.35 | 0.35 | 0.35 | 0.36 | 0.36 | 0.36 |
| Total | 100.00 | 100.00 | 100.00 | 100.00 | 100.00 | 100.00 | 100.00 | 100.00 |

| Metal Oxide Content | Example No. | | | | |
|---|---|---|---|---|---|
| mol % | 18/Nd | 19/Nd | 20/Nd2 | 21/Nd2 | 21/Nd |
| P$_2$O$_5$ | 52.88 | 47.90 | 47.88 | 47.891 | 47.78 |
| SiO$_2$ | | 10.00 | 15.00 | 10.01 | 2.43 |
| B$_2$O$_3$ | | | | 9.994 | 2.43 |
| Al$_2$O$_3$ | 5.62 | 5.62 | 5.61 | 5.617 | 3.98 |
| Li$_2$O | 5.52 | 5.49 | 2.52 | 2.502 | 3.98 |
| K$_2$O | 5.76 | 5.77 | 5.77 | 3.772 | 10.11 |
| Na$_2$O | | | | | 7.18 |
| MgO | 14.95 | 11.95 | 9.95 | 9.928 | 6.67 |
| CaO | 3.69 | 3.69 | 3.69 | 2.707 | 1.60 |
| BaO | 3.70 | 3.70 | 3.69 | 2.692 | 3.18 |
| TeO$_2$ | | | | | 2.43 |
| Ta$_2$O$_5$ | | | | | 2.43 |
| Nd$_2$O$_3$ | 0.62 | 0.61 | 0.61 | 0.615 | 0.58 |
| La$_2$O$_3$ | 1.46 | 1.46 | 1.46 | 1.458 | 2.43 |
| Nb$_2$O$_5$ | 5.46 | 3.46 | 3.46 | 2.457 | 2.43 |
| Sb$_2$O$_3$ | 0.35 | 0.36 | 0.36 | 0.355 | 0.33 |
| Total | 100.00 | 100.00 | 100.00 | 100.00 | 100.00 |

TABLE 4b

Optical/Thermal/Physical Properties of New EXL Laser Glasses Containing Nd$_2$O$_3$ and of Reference Glasses Nd: APG-1 and Nd: IOG-1

| Optical/Thermal/Physical Property | Example No. | | | | | | | | | |
|---|---|---|---|---|---|---|---|---|---|---|
| | 1/Nd | 2/Nd | 3/Nd | 4/Nd | 5/Nd | 6/Nd | 7/Nd | 8/Nd | 9/Nd | 10/Nd |
| Refractive Index at 587 nm @ 30 C./hr, n$_d$ | 1.52642 | 1.56284 | 1.53379 | 1.56490 | 1.54926 | 1.56038 | 1.55473 | 1.52676 | 1.56687 | 1.56405 |
| Abbe Number, V$_d$ | 64.65 | 54.39 | 64.23 | 54.37 | 59.08 | 54.96 | 55.31 | 64.92 | 54.72 | 54.20 |
| Density, ρ [g/cm$^3$] | 2.736 | 2.895 | 2.800 | 2.894 | 2.848 | 2.879 | 2.806 | 2.727 | 2.943 | 2.888 |
| Indentation Fracture Toughness for 3.0N Load, K$_{IC}$ | 0.538 | 0.561 | 0.649 | 0.581 | 0.619 | 0.569 | 0.623 | 0.566 | 0.591 | 0.581 |
| Indentation Fracture Toughness for 9.8N Load, K$_{IC}$ | | | | | | | | | | |
| Thermal Conductivity @ 25 C., K$_{25\,C.}$ [W/mK] | 0.57 | 0.61 | 0.58 | 0.60 | 0.58 | 0.59 | 0.62 | 0.58 | 0.58 | 0.60 |
| Thermal Conductivity @ 90 C., K$_{90\,C.}$ [W/mK] | 0.60 | 0.64 | 0.63 | 0.65 | 0.65 | 0.67 | 0.67 | 0.62 | 0.62 | 0.69 |

TABLE 4b-continued

Optical/Thermal/Physical Properties of New EXL Laser Glasses Containing $Nd_2O_3$ and of Reference Glasses Nd: APG-1 and Nd: IOG-1

| | | | | | | | | | | |
|---|---|---|---|---|---|---|---|---|---|---|
| Poisson Ratio, ν | 0.26 | 0.26 | 0.26 | 0.26 | 0.26 | 0.26 | 0.26 | 0.26 | 0.26 | 0.26 |
| Young's Modulas, E [GPa] | 52.88 | 60.38 | 56.01 | 61.78 | 58.81 | 59.28 | 60.60 | 54.30 | 60.37 | 61.19 |
| Linear Coef. of Thermal Expansion, $\alpha_{20\text{-}300\,C.}$ [$10^{-7}$/K] | 144.5 | 123.7 | 141.0 | 115.8 | 126.0 | 126.0 | 122.9 | 137.8 | 120.5 | 117 |
| Glass Transition Temperature, $T_g$ [C.] | 392 | 429 | 409 | 441 | 426 | 429 | 442 | 403 | 443 | 445 |
| Knoop Hardness, HK | 328.7 | 358.5 | 347.1 | 371.4 | 362.7 | 358.3 | 379.8 | 343.7 | 357.3 | 375.4 |
| $\alpha_{3.333\,\mu m}$ [$cm^{-1}$] (A measure of residual OH content) | 1.19 | 0.74 | 0.73 | 0.36 | 0.75 | 0.81 | 0.62 | 0.89 | 0.38 | 0.51 |
| $\alpha_{3.0\,\mu m}$ [$cm^{-1}$] (A measure of residual OH content) | 0.55 | 0.42 | 0.37 | 0.25 | 0.40 | 0.42 | 0.34 | 0.43 | 0.25 | 0.29 |

| Optical/Thermal/ Physical Property | Example No. | | | | | | | | | |
|---|---|---|---|---|---|---|---|---|---|---|
| | 11/Nd | 12/Nd | 13/Nd | 14/Nd | 15/Nd | 16/Nd | 17/Nd | 18/Nd | 19/Nd | 20/Nd2 |
| Refractive Index at 587 nm @ 30 C./hr, $n_d$ | 1.56905 | 1.53429 | 1.54262 | 1.53702 | 1.53138 | 1.55591 | 1.53550 | 1.58419 | 1.56319 | 1.55630 |
| Abbe Number, $V_d$ | 54.89 | 64.75 | 64.83 | 64.51 | 57.07 | 54.40 | 64.66 | 48.05 | 53.83 | 63.03 |
| Density, ρ [g/cm³] | 2.962 | 2.819 | 2.887 | 2.810 | 2.749 | 2.814 | 3.110 | 2.885 | 2.8245 | 2.782 |
| Indentation Fracture Toughness for 3.0N Load, $K_{IC}$ | 0.573 | 0.552 | 0.569 | 0.588 | 0.558 | 0.530 | 0.572 | 0.673 | 0.699 | 0.678 |
| Indentation Fracture Toughness for 9.8N Load, $K_{IC}$ | | | | | | | | | | |
| Thermal Conductivity @ 25 C., $K_{25\,C.}$ [W/mK] | 0.60 | 0.58 | 0.58 | 0.55 | 0.56 | 0.55 | 0.56 | 0.63 | 0.63 | 0.62 |
| Thermal Conductivity @ 90 C., $K_{90\,C.}$ [W/mK] | 0.65 | 0.63 | 0.64 | 0.64 | 0.65 | 0.65 | 0.65 | 0.73 | 0.74 | 0.74 |
| Poisson Ratio, ν | 0.26 | 0.26 | 0.26 | 0.26 | 0.26 | 0.26 | 0.26 | 0.25 | 0.25 | 0.24 |
| Young's Modulas, E [GPa] | 62.25 | 56.99 | 59.80 | 58.76 | 58.31 | 58.44 | 58.16 | 68.13 | 65.61 | 62.62 |
| Linear Coef. of Thermal Expansion, $\alpha_{20\text{-}300\,C.}$ [$10^{-7}$/K] | 116.9 | 134.6 | 136.2 | 130.6 | 139.9 | 127.4 | 133.5 | 83.6 | 89.1 | 79.1 |
| Glass Transition Temperature, $T_g$ [C.] | 450 | 408 | 429 | 423 | 420 | 428 | 427 | 477 | 479 | 518 |
| Knoop Hardness, HK | 374.5 | 342.6 | 352.3 | 364.4 | 353.8 | 357.2 | 363.9 | 424.0 | 460.7 | 401.1 |
| $\alpha_{3.333\,\mu m}$ [$cm^{-1}$] (A measure of residual OH content) | 0.66 | 0.44 | 0.47 | 0.69 | 0.93 | 0.40 | 0.51 | 0.43 | 0.40 | 0.48 |
| $\alpha_{3.0\,\mu m}$ [$cm^{-1}$] (A measure of residual OH content) | 0.40 | 0.25 | 0.29 | 0.39 | 0.47 | 0.23 | 0.28 | 0.28 | 0.27 | 0.31 |

| Optical/Thermal/ Physical Property | Example No. | | | |
|---|---|---|---|---|
| | 21/Nd2 | EXL-21/Nd | Nd: APG-1 | Nd: IOG-1 |
| Refractive Index at 587 nm @ 30 C./hr, $n_d$ | 1.54955 | | 1.53269 | 1.52490 |
| Abbe Number, $V_d$ | 57.43 | | 67.8 | 67.5 |
| Density, ρ [g/cm³] | 2.731 | C | 2.607 | 2.718 |
| Indentation Fracture Toughness for 3.0N Load, $K_{IC}$ | 0.81 | R | 0.83 | |
| Indentation Fracture Toughness for 9.8N Load, $K_{IC}$ | | Y | 0.91 | |
| Thermal Conductivity @ 25 C., $K_{25\,C.}$ [W/mK] | 0.64 | S | 0.79 | |
| Thermal Conductivity @ 90 C., $K_{90\,C.}$ [W/mK] | 0.77 | T | 0.86 | |
| Poisson Ratio, ν | 0.24 | A | 0.25 | |
| Young's Modulas, E [GPa] | 67.25 | L | 66.75 | |
| Linear Coef. of Thermal Expansion, $\alpha_{20\text{-}300\,C.}$ [$10^{-7}$/K] | 71.7 | S | 99.3 | |
| Glass Transition Temperature, $T_g$ [C.] | 562 | P, Ta, Nb | 457 | |
| Knoop Hardness, HK | 492.7 | And | 433.8 | |
| $\alpha_{3.333\,\mu m}$ [$cm^{-1}$] (A measure of residual OH content) | 1.14 | P, Ta | 1.28 | |
| $\alpha_{3.0\,\mu m}$ [$cm^{-1}$] (A measure of residual OH content) | 0.62 | | 0.64 | 0.46 |

TABLE 4c

Laser properties of New EXL Laser Glasses Containing $Nd_2O_3$ and of Reference Glasses Nd: APG-1 and Nd: IOG-1

| Laser Property | 1/Nd | 2/Nd | 3/Nd | 4/Nd | 5/Nd | 6/Nd | 7/Nd | 8/Nd | 9/Nd |
|---|---|---|---|---|---|---|---|---|---|
| Refractive Index at 1054 nm, $n_{1054\,nm}$ | 1.518 | 1.552 | 1.525 | 1.554 | 1.540 | 1.55 | 1.544 | 1.518 | 1.556 |
| Non-linear Refractive Index, $n_2$ [$10^{-13}$ esu] | 1.17 | 1.69 | 1.21 | 1.70 | 1.43 | 1.65 | 1.61 | 1.16 | 1.69 |
| Fluorescence Lifetime, $\tau$ [μsec] | 378.5 | 369.9 | 386.8 | 377.4 | 383.0 | 377.5 | 380.5 | 385.4 | 376.9 |
| Input $Nd_2O_3$ [wt %] | 1.88 | 1.62 | 1.72 | 1.63 | 1.67 | 1.63 | 1.66 | 1.87 | 1.57 |
| Peak Emission Wavelength, $\lambda_{Peak}$ [nm] | 1053.1 | 1053.9 | 1053.5 | 1054.0 | 1054.0 | 1054.5 | 1054.6 | 1053.7 | 1054.7 |
| Effective Emission Bandwidth, $\Delta\lambda_{eff}$ [nm] | 22.47 | 22.68 | 25.21 | 26.08 | 25.33 | 27.20 | 28.64 | 24.95 | 27.88 |
| Maximum Emission Cross Section, $\sigma_{em}$ [cm$^2$] | 4.03 | 4.01 | 4.00 | 3.82 | 3.95 | 3.61 | 3.44 | 4.18 | 3.55 |
| FWHM Emission Bandwidth, $\Delta\lambda_{FWHM}$ [nm] | 18.80 | 21.00 | 20.60 | 21.90 | 21.90 | 22.70 | 22.70 | 20.90 | 22.40 |
| Radiative Lifetime, $\tau_{Rad}$ (μsec) | 387 | 366 | 347 | 337 | 342 | 346 | 345 | 339 | 339 |
| Judd-Ofelt Parameter, $\Omega_2$ [$10^{-20}$ cm$^2$] | 3.46 | 3.89 | 4.32 | 4.82 | 4.54 | 4.54 | 4.77 | 4.29 | 4.61 |
| Judd-Ofelt Parameter, $\Omega_4$ [$10^{-20}$ cm$^2$] | 4.27 | 4.36 | 4.64 | 4.55 | 4.60 | 4.46 | 4.56 | 4.81 | 4.50 |
| Judd-Ofelt Parameter, $\Omega_6$ [$10^{-20}$ cm$^2$] | 5.00 | 4.81 | 5.56 | 5.35 | 5.44 | 5.29 | 5.32 | 5.78 | 5.31 |

| Laser Property | 10/Nd | 11/Nd | 12/Nd | 13/Nd | 14/Nd | 15/Nd | 16/Nd | 17/Nd |
|---|---|---|---|---|---|---|---|---|
| Refractive Index at 1054 nm, $n_{1054\,nm}$ | 1.553 | 1.558 | 1.526 | 1.534 | 1.528 | 1.523 | 1.545 | 1.527 |
| Non-linear Refractive Index, $n_2$ [$10^{-13}$ esu] | 1.70 | 1.70 | 1.20 | 1.22 | 1.21 | 1.20 | 1.65 | 1.20 |
| Fluorescence Lifetime, $\tau$ [μsec] | 377.5 | 371.5 | 380.6 | 379.2 | 382.5 | 383.6 | 380.5 | 386.1 |
| Input $Nd_2O_3$ [wt %] | 1.61 | 1.51 | 1.74 | 1.66 | 1.72 | 1.80 | 1.69 | 1.73 |
| Peak Emission Wavelength, $\lambda_{Peak}$ [nm] | 1054.5 | 1054.8 | 1055.0 | 1054.9 | 1054.2 | 1054.0 | 1053.5 | 1053.7 |
| Effective Emission Bandwidth, $\Delta\lambda_{eff}$ [nm] | 26.81 | 30.78 | 27.15 | 27.24 | 26.28 | 26.83 | 26.31 | 25.69 |
| Maximum Emission Cross Section, $\sigma_{em}$ [cm$^2$] | 3.61 | 3.21 | 3.78 | 3.63 | 3.87 | 3.79 | 3.83 | 3.44 |
| FWHM Emission Bandwidth, $\Delta\lambda_{FWHM}$ [nm] | 22.90 | 23.70 | 21.30 | 22.80 | 22.40 | 22.40 | 20.90 | 22.00 |
| Radiative Lifetime, $\tau_{Rad}$ (μsec) | 348 | 339 | 342 | 351 | 343 | 346 | 338 | 395 |
| Judd-Ofelt Parameter, $\Omega_2$ [$10^{-20}$ cm$^2$] | 4.68 | 4.74 | 4.42 | 4.46 | 4.61 | 4.49 | 4.65 | 3.98 |
| Judd-Ofelt Parameter, $\Omega_4$ [$10^{-20}$ cm$^2$] | 4.42 | 4.50 | 4.71 | 4.51 | 4.67 | 4.69 | 4.58 | 4.04 |
| Judd-Ofelt Parameter, $\Omega_6$ [$10^{-20}$ cm$^2$] | 5.19 | 5.27 | 5.65 | 5.42 | 5.59 | 5.62 | 5.47 | 4.88 |

| Laser Property | 18/Nd | 19/Nd | 20/Nd2 | 21/Nd2 | 21/Nd | Nd: APG-1 | Nd: IOG-1 |
|---|---|---|---|---|---|---|---|
| Refractive Index at 1054 nm, $n_{1054\,nm}$ | 1.572 | 1.552 | 1.547 | 1.540 |  | 1.525 | 1.525 |
| Non-linear Refractive Index, $n_2$ [$10^{-13}$ esu] | 2.16 | 1.72 | 1.33 | 1.50 |  | 1.11 | 1.11 |
| Fluorescence Lifetime, $\tau$ [μsec] | 370.4 | 380.7 | 391.8 | 392.4 | c | 353.9 | 359.4 |
| Input $Nd_2O_3$ [wt %] | 1.67 | 1.77 | 1.75 | 1.80 | r | 2.96 | 2.05 |
| Peak Emission Wavelength, $\lambda_{Peak}$ [nm] | 1055.3 | 1054.6 | 1053.7 | 1054.7 | y | 1054.3 | 1053.4 |
| Effective Emission Bandwidth, $\Delta\lambda_{eff}$ [nm] | 32.33 | 33.25 | 28.71 | 34.73 | s | 28.44 | 24.78 |
| Maximum Emission Cross Section, $\sigma_{em}$ [cm$^2$] | 2.92 | 2.77 | 3.15 | 2.37 | t | 3.68 | 3.91 |
| FWHM Emission Bandwidth, $\Delta\lambda_{FWHM}$ [nm] | 25.20 | 25.30 | 24.00 | 26.60 | a | 23.3 | 21.70 |
| Radiative Lifetime, $\tau_{Rad}$ (μsec) | 347 | 366 | 372 | 416 | l | 331 | 364.28 |
| Judd-Ofelt Parameter, $\Omega_2$ [$10^{-20}$ cm$^2$] | 5.13 | 4.97 | 5.37 | 5.64 | s | 4.43 | 4.55 |
| Judd-Ofelt Parameter, $\Omega_4$ [$10^{-20}$ cm$^2$] | 4.33 | 4.21 | 4.24 | 3.86 |  | 5.05 | 4.51 |

TABLE 4c-continued

Laser properties of New EXL Laser Glasses Containing $Nd_2O_3$ and of Reference Glasses Nd:APG-1 and Nd:IOG-1

| | | | | | | |
|---|---|---|---|---|---|---|
| Judd-Ofelt Parameter, $\Omega_6$ [$10^{-20}$ cm$^2$] | 4.96 | 4.94 | 4.86 | 4.42 | 5.68 | 5.37 |

TABLE 5a

Examples prepared with Nd (mol %), where other glass formers $BiO_3$, $GeO_2$ and $WO_3$ are used

| Metal Oxide Content mol % | Example No. 17/Nd (baseline) | 22/Nd | 23/Nd | Metal Oxide Content mol % | Example No. 24/Nd | 25/Nd | Metal Oxide Content mol % | Example No. 26/Nd | 27/Nd |
|---|---|---|---|---|---|---|---|---|---|
| $P_2O_5$ | 51.79 | 45.00 | 45.00 | $P_2O_5$ | 45.00 | 45.00 | $P_2O_5$ | 45.00 | 45.00 |
| $SiO_2$ | 2.64 | 10.00 | 5.00 | $SiO_2$ | 10.00 | 5.00 | $SiO_2$ | 10.00 | 5.00 |
| $B_2O_3$ | 2.64 | 10.00 | 5.00 | $B_2O_3$ | 10.00 | 5.00 | $B_2O_3$ | 10.00 | 5.00 |
| $Al_2O_3$ | 4.31 | 4.31 | 4.31 | $Al_2O_3$ | 4.31 | 4.31 | $Al_2O_3$ | 4.31 | 4.31 |
| $Li_2O$ | 2.55 | 2.55 | 3.85 | $Li_2O$ | 2.55 | 3.85 | $Li_2O$ | 2.55 | 3.85 |
| $K_2O$ | 10.96 | 6.76 | 10.96 | $K_2O$ | 6.76 | 10.96 | $K_2O$ | 6.76 | 10.96 |
| $Na_2O$ | 7.78 | 7.78 | 7.78 | $Na_2O$ | 7.78 | 7.78 | $Na_2O$ | 7.78 | 7.78 |
| MgO | 7.62 | 7.62 | 7.62 | MgO | 7.62 | 7.62 | MgO | 7.62 | 7.62 |
| CaO | 1.73 | 0.00 | 0.00 | CaO | 0.00 | 0.00 | CaO | 0.00 | 0.00 |
| BaO | 1.72 | 0.00 | 0.00 | BaO | 0.00 | 0.00 | BaO | 0.00 | 0.00 |
| $TeO_2$ | 1.76 | 0.00 | 2.00 | $TeO_2$ | 0.00 | 2.00 | $TeO_2$ | 0.00 | 2.00 |
| $Bi_2O_3$ | 0.00 | 3.00 | 6.00 | $GeO_2$ | 3.00 | 6.00 | $WO_3$ | 3.00 | 6.00 |
| $Nd_2O_3$ | 0.62 | 0.62 | 0.62 | $Nd_2O_3$ | 0.62 | 0.62 | $Nd_2O_3$ | 0.62 | 0.62 |
| $La_2O_3$ | 3.52 | 2.00 | 1.50 | $La_2O_3$ | 2.00 | 1.50 | $La_2O_3$ | 2.00 | 1.50 |
| $Sb_2O_3$ | 0.36 | 0.36 | 0.36 | $Sb_2O_3$ | 0.36 | 0.36 | $Sb_2O_3$ | 0.36 | 0.36 |
| Total | 100.00 | 100.00 | 100.00 | Total | 100.00 | 100.00 | Total | 100.00 | 100.00 |

TABLE 5b

Optical Properties of Examples prepared with Nd, where other glass formers $BiO_3$, $GeO_2$ and $WO_3$ are used

| Optical Property | 22/Nd | 23/Nd | 24/Nd | 25/Nd | 26/Nd | 27/Nd |
|---|---|---|---|---|---|---|
| Refractive index at 587 nm @ 30 C./hr, $n_d$ | 1.561 | NA | 1.534 | NA | 1.54034 | 1.54612 |
| Abbe Number, $V_d$ | NA | NA | NA | NA | NA | 58.48 |
| Density, $\rho$ [g/cm$^3$] | 2.943 | NA | 2.727 | NA | 2.792 | 2.885 |
| Appearance | glass | ceramic | glass | part ceramic | glass | glass |
| Color | brownish | opaque | brownish | opaque | bluish | brownish |

TABLE 5c

Laser Properties of Examples prepared with Nd, where other glass formers $BiO_3$, $GeO_2$ and $WO_3$ are used

| Laser Property | 22/Nd | 23/Nd | 24/Nd | 25/Nd | 26/Nd | 27/Nd |
|---|---|---|---|---|---|---|
| Refractive Index at 1054 nm, $n_{1054\,nm}$ | NA | NA | NA | NA | NA | NA |
| Non-linear Refractive Index, $n_2$ [$10^{-13}$ esu] | NA | NA | NA | NA | NA | NA |
| Fluorescence Lifetime, $\tau$ [μsec] | NA | NA | NA | NA | NA | NA |
| Input $Nd_2O_3$ [wt %] | 1.74 | NA | 1.91 | NA | 1.85 | NA |
| Peak Emission Wavelength, $\lambda_{Peak}$ [nm] | 1054.1 | NA | 1053.1 | NA | 1053.6 | NA |
| Effective Emission Bandwidth, $\Delta\lambda_{eff}$ [nm] | 28.53 | NA | 33.24 | NA | 28.20 | NA |
| Maximum Emission Cross Section, $\sigma_{em}$ [cm$^2$] | 3.30 | NA | 2.61 | NA | 3.53 | NA |
| FWHM Emission Bandwidth, $\Delta\lambda_{FWHM}$ [nm] | 23.7 | NA | 25.2 | NA | 23.6 | NA |
| Radiative Lifetime, $\tau_{Rad}$ (μsec) | 313 | NA | 339 | NA | 317 | NA |
| Judd-Ofelt Parameter, $\Omega_2$ [$10^{-20}$ cm$^2$] | 2.90 | NA | 3.50 | NA | 4.64 | NA |
| Judd-Ofelt Parameter, $\Omega_4$ [$10^{-20}$ cm$^2$] | 6.70 | NA | 6.94 | NA | 5.79 | NA |
| Judd-Ofelt Parameter, $\Omega_6$ [$10^{-20}$ cm$^2$] | 4.24 | NA | 3.77 | NA | 4.92 | NA |

TABLE 6a

Examples (mol %) with Pr instead of Yb or Nd

| Metal Oxide Content | Example No. | |
|---|---|---|
| mol % | 17/Pr | 21/Pr |
| $P_2O_5$ | 51.79 | 47.89 |
| $SiO_2$ | 2.64 | 10.00 |
| $B_2O_3$ | 2.64 | 10.00 |
| $Al_2O_3$ | 4.31 | 5.62 |
| $Li_2O$ | 2.55 | 4.96 |
| $K_2O$ | 10.96 | 3.77 |
| $Na_2O$ | 7.78 | 0.00 |
| MgO | 7.62 | 9.94 |
| CaO | 1.73 | 2.70 |
| BaO | 1.72 | 2.69 |
| $TeO_2$ | 1.76 | 0.00 |
| $Nb_2O_5$ | 0.00 | 0.00 |
| $Pr_2O_3$ | 0.62 | 0.61 |
| $La_2O_3$ | 3.52 | 1.46 |
| $Sb_2O_3$ | 0.36 | 0.35 |
| Total | 100.00 | 100.00 |

TABLE 6b

Optical Properties of Examples with Pr instead of Yb or Nd and reference Pr:IOG-1

| | Example No. | | |
|---|---|---|---|
| Optical Property | Pr:IOG-1 | 17/Pr | 21/Pr |
| Refractive Index at 587 nm @ 30 C./hr, $n_d$ | 1.5256 | 1.53507 | 1.53329 |
| Abbe Number, $V_d$ | NA | NA | NA |
| Density, $\rho$ [g/cm$^3$] | 2.728 | 2.792 | 2.696 |
| Appearance | glass | glass | glass |
| Color | lt. green | brownish | lt. green |

TABLE 6c

Laser Properties of Examples with Pr instead of Yb or Nd and reference Pr:IOG-1

| | Example No. | | |
|---|---|---|---|
| Laser Property | 17/Pr | 21/Pr | Pr:IOG-1 |
| $\lambda_{lower}$ [nm] | NA | 478.2 | 478.5 |
| $\lambda_{upper}$ [nm] | NA | 492.9 | 489.6 |
| $\Delta\lambda_{FWHM}$ [nm] | NA | 14.70 | 11.10 |
| $\lambda_{Peak}$ [nm] | NA | 480.9 | 481.2 |
| $\Delta\lambda_{eff}$ [nm] | NA | 14.49 | 12.15 |

TABLE 7a

Examples (mol %) with Er instead of Yb or Nd

| Metal Oxide Content | Example No. | |
|---|---|---|
| mol % | 17/Er | 21/Er |
| $P_2O_5$ | 51.79 | 47.89 |
| $SiO_2$ | 2.64 | 10.00 |
| $B_2O_3$ | 2.64 | 10.00 |
| $Al_2O_3$ | 4.31 | 5.62 |
| $Li_2O$ | 2.55 | 4.96 |
| $K_2O$ | 10.96 | 3.77 |
| $Na_2O$ | 7.78 | 0.00 |
| MgO | 7.62 | 9.94 |
| CaO | 1.73 | 2.70 |
| BaO | 1.72 | 2.69 |
| $TeO_2$ | 1.76 | 0.00 |
| $Nb_2O_5$ | 0.00 | 0.00 |
| $Er_2O_3$ | 0.62 | 0.61 |
| $La_2O_3$ | 3.52 | 1.46 |
| $Sb_2O_3$ | 0.36 | 0.35 |
| Total | 100.00 | 100.00 |

TABLE 7b

Optical Properties of Examples with Er instead of Yb or Nd and reference Er:IOG-1

| | Example No. | | |
|---|---|---|---|
| Optical Property | Er:IOG-1 | 17/Er | 21/Er |
| Refractive Index at 587 nm @ 30 C./hr, $n_d$ | 1.523 | 1.53457 | 1.53149 |
| Abbe Number, $V_d$ | 67.28 | 65.10 | 66.99 |
| Density, $\rho$ [g/cm$^3$] | 2.721 | 2.804 | 2.695 |
| Appearance | glass | glass | glass |
| Color | pink | brown/pink | pink |

TABLE 7c

Laser Properties of Examples with Er instead of Yb or Nd and reference Er:IOG-1

| | Example No. | | |
|---|---|---|---|
| Laser Property | 17/Er | 21/Er | Er:IOG-1 |
| $\lambda_{lower}$ [nm] | NA | 1527.2 | 1526.6 |
| $\lambda_{upper}$ [nm] | NA | 1550.0 | 1556.6 |
| $\Delta\lambda_{FWHM}$ [nm] | NA | 22.80 | 30.00 |
| $\lambda_{Peak}$ [nm] | NA | 1533.9 | 1533.5 |
| $\Delta\lambda_{eff}$ [nm] | NA | 40.80 | 49.15 |

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A laser phosphate glass having the composition in mol % of

| | |
|---|---|
| $P_2O_5$ | 35-65 |
| $SiO_2$ | 0-20 |
| $B_2O_3$ | 0-15 |
| $Al_2O_3$ | >0-10 |
| $Nb_2O_5$ | 0-10 |
| $TeO_2$ | 0-5 |
| $GeO_2$ | 0-5 |
| $WO_3$ | 0-5 |
| $Bi_2O_3$ | 0-5 |
| $La_2O_3$ | 0-5 |
| $Ln_2O_3$ | >0-10 (Ln = one of lasing ions of elements 58 through 71 in the periodic table) |
| $R_2O$ | 10-30 (R = one of Li, Na, K, Rb, Cs) |
| MO | 10-30 (M = one of Mg, Ca, Sr, Ba, Zn) |
| $Sb_2O_3$ | 0-5 | and wherein two or more of $SiO_2$, $B_2O_3$, $TeO_2$, $Nb_2O_5$, $Bi_2O_3$, $WO_3$, and/or $GeO_2$ are present, with their sum being at least 1 mol %,
and wherein $K_2O$ is excluded from the glass composition.

2. The laser phosphate glass according to claim 1 having the composition in mol % of

| | |
|---|---|
| $P_2O_5$ | 40.00-65.00 |
| $SiO_2$ | 0.00-18.00 |
| $B_2O_3$ | 0.00-12.00 |
| $Al_2O_3$ | 2.00-8.00 |
| $Li_2O$ | 0.00-20.00 |
| $K_2O$ | 0.00-20.00 |
| $Na_2O$ | 0.00-20.00 |
| MgO | 0.00-15.00 |
| CaO | 0.00-5.00 |
| BaO | 0.00-15.00 |
| $TeO_2$ | 0.00-5.00 |
| $Nd_2O_3$ and/or $Yb_2O_3$ | 0.50-3.00 |
| $La_2O_3$ | 0.00-5.00 |
| $Nb_2O_5$ | 0.00-5.00 |
| $Sb_2O_3$ | 0.00-2.00 | wherein the composition contains at least 1.00 mol % of $TeO_2$, $SiO_2$, $B_2O_3$ or $Nb_2O_5$, or a combination thereof.

3. The laser phosphate glass according to claim 1 having the composition in mol % of

| | |
|---|---|
| $P_2O_5$ | 49.00-57.00 |
| $SiO_2$ | 0.00-10.00 |
| $B_2O_3$ | 0.00-5.00 |
| $Al_2O_3$ | 2.00-6.00 |
| $Li_2O$ | 1.00-18.00 |
| $K_2O$ | 1.00-18.00 |
| $Na_2O$ | 0.00-10.00 |
| MgO | 1.00-12.00 |
| CaO | 0.00-3.00 |
| BaO | 1.00-12.00 |
| $TeO_2$ | 0.00-4.00 |
| $Yb_2O_3$ | 1.00-2.50 |
| $La_2O_3$ | 0.50-3.00 |
| $Nb_2O_5$ | 0.00-4.00 |
| $Sb_2O_3$ | 0.20-0.50 | wherein the composition contains at least 1.00 mol % of $TeO_2$, $SiO_2$, $B_2O_3$ or $Nb_2O_5$, or a combination thereof.

4. The glass according to claim 1, which has a $\Delta\lambda_{eff}$ that is higher than the $\Delta\lambda_{eff}$ of the otherwise same glass with the exception of the absence of $SiO_2$, $B_2O_3$, $TeO_2$, $Nb_2O_5$, $Bi_2O_3$, $WO_3$, and/or $GeO_2$ from said glass.

5. The glass according to claim 1, which contains Yb only as the rare earth dopant, and has a $\Delta\lambda_{eff}$ that is at least 38 nm evaluated by the lineshape function technique in a Judd-Ofelt analysis.

6. The glass according to claim 1, which contains Yb only as the rare earth dopant, and has a $\Delta\lambda_{eff}$ that is 40.0 nm to 54.00 nm evaluated by the lineshape function technique in a Judd-Ofelt analysis.

7. The glass according to claim 1, which contains Nd only as the rare earth dopant, and has a $\Delta\lambda_{eff}$ that is at least 32 nm evaluated by the lineshape function technique in a Judd-Ofelt analysis.

8. The glass according to claim 7, which contains 45 to 50 mol % $P_2O_5$.

9. The glass according to claim 1, which contains Nd only as the rare earth dopant, and has a $\Delta\lambda_{eff}$ that is 32.00 nm to 36.50 nm evaluated by the lineshape function technique in a Judd-Ofelt analysis.

10. The glass according to claim 1, further comprising one or more additives, impurities, refining agents, antisolarants and/or halides.

11. The glass according to claim 1, which contains Pr as the rare earth dopant.

12. In a solid state laser system comprising a solid gain medium and a pumping source, the improvement wherein said solid gain medium is a glass having a composition in accordance with claim 1.

13. The laser system according to claim 12, wherein the power output of system is at least a petawatt or greater.

14. A method for generating a laser beam comprising flashlamp pumping or diode pumping a glass according to claim 1.

15. A method for lowering the nonlinear refractive index and/or lowering the thermal expansion of a glass according to claim 1 that contains Nd as the rare earth dopant, comprising replacing at least some of said Nd with Yb, and optionally further replacing at least some of the La therein with Yb, and optionally adding further Yb.

16. The glass according to claim 1, wherein three or more of $SiO_2$, $B_2O_3$, $TeO_2$, $Nb_2O_5$, $Bi_2O_3$, $WO_3$, and/or $GeO_2$ are present.

17. The glass according to claim 1, wherein two or more of $SiO_2$, $TeO_2$, $Nb_2O_5$, $Bi_2O_3$, $WO_3$, and/or $GeO_2$ are present.

* * * * *

UNITED STATES PATENT AND TRADEMARK OFFICE
CERTIFICATE OF CORRECTION

| | |
|---|---|
| PATENT NO. | : 8,526,475 B2 |
| APPLICATION NO. | : 12/851947 |
| DATED | : September 3, 2013 |
| INVENTOR(S) | : Hong Li et al. |

Page 1 of 1

It is certified that error appears in the above-identified patent and that said Letters Patent is hereby corrected as shown below:

In the Claims:

Column 27, lines 51 - 58 (Claim 3), reads:

| | |
|---|---|
| $P_2O_5$ | 49.00 – 57.00 |
| $SiO_2$ | 0.00 – 10.00 |
| $B_2O_3$ | 0.00 – 5.00 |
| $Al_2O_3$ | 2.00 – 6.00 |
| $Li_2O$ | 1.00 – 18.00 |
| $K_2O$ | 1.00 – 18.00 |
| $Na_2O$ | 0.00 – 10.00 |
| $MgO$ | 1.00 – 12.00 |

Should read:

| | |
|---|---|
| $P_2O_5$ | 49.00 – 57.00 |
| $SiO_2$ | 0.00 – 10.00 |
| $B_2O_3$ | 0.00 – 5.00 |
| $Al_2O_3$ | 2.00 – 6.00 |
| $Li_2O$ | 1.00 – 18.00 |
| $Na_2O$ | 0.00 – 10.00 |
| $MgO$ | 1.00 – 12.00 |

Signed and Sealed this
Twelfth Day of November, 2013

Teresa Stanek Rea
*Deputy Director of the United States Patent and Trademark Office*